US011865720B2

(12) United States Patent
Eto et al.

(10) Patent No.: US 11,865,720 B2
(45) **Date of Patent: *Jan. 9, 2024**

(54) HANDLING DEVICE AND CONTROL DEVICE

(71) Applicant: KABUSHIKI KAISHA TOSHIBA, Tokyo (JP)

(72) Inventors: Haruna Eto, Kawasaki Kanagawa (JP); Seiji Tokura, Kawasaki Kanagawa (JP); Kazuma Komoda, Kawasaki Kanagawa (JP); Ping Jiang, Ota Tokyo (JP); Akihito Ogawa, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 17/004,094

(22) Filed: Aug. 27, 2020

(65) Prior Publication Data

US 2021/0291366 A1 Sep. 23, 2021

(30) Foreign Application Priority Data

Mar. 18, 2020 (JP) ................................ 2020-047741

(51) Int. Cl.

*B25J 9/16* (2006.01)
*B25J 15/00* (2006.01)

(52) U.S. Cl.

CPC .......... *B25J 9/1653* (2013.01); *B25J 9/1612* (2013.01); *B25J 9/1664* (2013.01); *B25J 15/00* (2013.01);

(Continued)

(58) Field of Classification Search

CPC ...... B25J 9/1653; B25J 9/1664; B25J 9/1612; B25J 15/00; B25J 9/1674; G05B 2219/39504; G05B 2219/39505

See application file for complete search history.

(56) References Cited

U.S. PATENT DOCUMENTS 9,205,558 B1 12/2015 Zevenbergen et al.
9,457,477 B1 10/2016 Rublee et al.

(Continued)

FOREIGN PATENT DOCUMENTS

EP 3 616 856 A1 3/2020
JP H9-300255 A 11/1997

(Continued)

OTHER PUBLICATIONS

Lopez-Damian E., Sidobre D., Alami R., "A Grasp Planner Based on Inertial Properties", Apr. 2005, IEEE, International Conference on Robotics and Automation, pp. 754-759 (Year: 2005).*

(Continued)

*Primary Examiner* — Abby Y Lin
*Assistant Examiner* — Karston G. Evans
(74) *Attorney, Agent, or Firm* — Finnegan, Henderson, Farabow, Garrett & Dunner, LLP

(57) ABSTRACT

According to one embodiment, a handling device includes: a holding part that includes two or more supporting parts and is capable of holding an object by gripping the object with the two or more supporting parts; a calculation part configured to calculate a safety factor indicating safety of a state of the holding part holding the object; and a controller configured to cause the holding part to hold the object according to the safety factor.

11 Claims, 19 Drawing Sheets

1 11 10 102 100 101 102 O V1 101 12 102 101 202 200 201 O V2 102 201 13 O

(52) U.S. Cl.
CPC .............. *G05B 2219/39504* (2013.01); *G05B 2219/39505* (2013.01)

(56) References Cited

U.S. PATENT DOCUMENTS

| | | | | |
|---|---|---|---|---|
| 9,498,887 | B1 | 11/2016 | Zevenbergen et al. | |
| 9,827,670 | B1* | 11/2017 | Strauss | B25J 9/0009 |
| 10,556,338 | B1* | 2/2020 | Marchese | B25J 9/1612 |
| 2006/0012198 | A1* | 1/2006 | Hager | B25J 9/1612 294/106 |
| 2011/0268548 | A1* | 11/2011 | Doll | B25J 15/00 414/688 |
| 2013/0211593 | A1 | 8/2013 | Domae et al. | |
| 2014/0214202 | A1* | 7/2014 | Nammoto | B25J 9/1612 700/245 |
| 2014/0316572 | A1 | 10/2014 | Iwatake | |
| 2014/0316573 | A1* | 10/2014 | Iwatake | B25J 9/1694 700/258 |
| 2015/0127162 | A1* | 5/2015 | Gotou | B25J 9/1612 700/259 |
| 2018/0056512 | A1 | 3/2018 | Watts | |
| 2018/0126551 | A1 | 5/2018 | Amano et al. | |
| 2019/0001508 | A1 | 1/2019 | Li et al. | |
| 2019/0143507 | A1 | 5/2019 | Nishina et al. | |
| 2019/0152058 | A1* | 5/2019 | Hang | B25J 15/0052 |
| 2019/0283241 | A1 | 9/2019 | Eto et al. | |
| 2019/0283251 | A1 | 9/2019 | Nakamoto | |
| 2020/0215685 | A1* | 7/2020 | Jamali | B25J 9/163 |
| 2020/0282565 | A1 | 9/2020 | Nakamoto | |
| 2020/0331709 | A1* | 10/2020 | Huang | B65G 47/905 |
| 2020/0376659 | A1* | 12/2020 | Diankov | B25J 13/08 |
| 2021/0060769 | A1* | 3/2021 | Eto | B25J 9/1664 |
| 2021/0178579 | A1* | 6/2021 | Saunders | B25J 15/0052 |

FOREIGN PATENT DOCUMENTS

| | | | |
|---|---|---|---|
| JP | 2000-254884 | A | 9/2000 |
| JP | 2002-36159 | A | 2/2002 |
| JP | 2013-39638 | A | 2/2013 |
| JP | 5558585 | B2 | 7/2014 |
| JP | 6258556 | B1 | 1/2018 |
| JP | 6258557 | B1 | 1/2018 |
| JP | 2018-58175 | A | 4/2018 |
| JP | 6325174 | B2 | 5/2018 |
| JP | 6363294 | B1 | 7/2018 |
| JP | 6444499 | B1 | 12/2018 |
| JP | 2019-89157 | | 6/2019 |
| JP | 2019-162685 | A | 9/2019 |
| JP | 2020-32479 | A | 3/2020 |

OTHER PUBLICATIONS

Abdeetedal, M., Kermani, M., "Optimal Grasp Synthesis to Apply Normal and Shear Stresses of Failure in Beams", Jul. 2016, 2016 IEEE International Conference on Advanced Intelligent Mechatronics (AIM), pp. 395-400 (Year: 2016).*

Sinha, P., Abel, J., "A Contact Stress Model for Multifingered Grasps of Rough Objects", Feb. 1992, IEEF Transactions on Robotics and Automation, vol. 8, No. 1, pp. 7-22 (Year: 1992).*

Jan. 14, 2022, Office Action issued in U.S. Appl. No. 16/798,562 (20 pages).

Jun. 1, 2022, Office Action issued in U.S. Appl. No. 16/798,562 (25 pages).

Ch. Borst et al., "Grasp Planning: How to Choose a Suitable Task Wrench Space," Robotics and Automation, Proc. of the 2004 IEEE Int'l Conf. on Robotics and Automation, vol. 1, pp. 319-325, XP010768295, DOI :10.1109/ROBOT.2004.1307170, ISBN: 978-0-7803-8232-9 (2004).

Matanya B. Horowitz et al., "Combined Grasp and Manipulation Planning as a Trajectory Optimization Problem," 2012 IEEE Int'l Conf. on Robotics and Automation, pp. 584-59, XP032450835, DOI:10.1109/ICRA.2012.6225104, ISBN: 978-1-4673-1403-9 (2012).

Amir M. Ghalamzan E. et al., "Task-relevant grasp selection: a joint solution to planning grasps and manipulative motion trajectories," 2016 IEEE/RSJ Int'l Conf. on Intelligent Robots and Systems (IROS), pp. 907-914, XP033011508, DOI: 10.1109/IROS.2016.7759158, (2016).

* cited by examiner

HANDLING DEVICE AND CONTROL DEVICE

CROSS-REFERENCE TO RELATED APPLICATION

This application is based upon and claims the benefit of priority from Japanese Patent Application No. 2020-047741, filed Mar. 18, 2020; the entire contents of (all of) which are incorporated herein by reference.

FIELD

Embodiments described herein relate generally to a handling device and a control device.

BACKGROUND

An automation system utilizing a picking system for physical distribution often holds and transports objects of various sizes and weights. Since it costs to switch the robot system itself according to the type of the object, it is an issue how well one robot system can handle various objects. For example, as a robot system, there is a picking system including a picking device that moves an object using a picking hand. The picking system operates the picking device according to trajectory information that defines a trajectory that does not cause interference on the trajectory for disposing the object from the first position to the second position.

There is a handling device including an end effector (hand) having a finger or a nail that holds an object by gripping the object. In the handling device, there are various holding methods depending on the positions of the object and the finger and the force with which the finger grips the object. The holding method using the above hand includes inclusion holding and friction holding. Inclusive holding is defined as successful holding if an object of a certain weight is located in the space within the hand formed by the closing of each finger to some extent. The hand cannot hold large objects because the space created is much smaller than the container or system size. Further, when the number of fingers is small, a small object or a thin object falls from the gap between the fingers, and the hand cannot hold such an object.

For the above reasons, containment holding lacks versatility. Therefore, friction holding is the mainstream as a method for holding various articles freely. In a conventional handling device using friction holding, a holding method capable of holding a position close to the center of gravity has been given priority when an object has a complicated shape. However, under the condition that the weight of the object is large or the object is eccentric, even if the hand can hold the object in the container, it may not be possible to stably hold the object. For example, when the holding position is far from the center of gravity of the object, the object may fall when the hand lifts the object or while the hand transports the object.

An embodiment of the present invention provides a handling device, a control device, and a program capable of stably holding an object.

DETAILED DESCRIPTION

Figure 1:
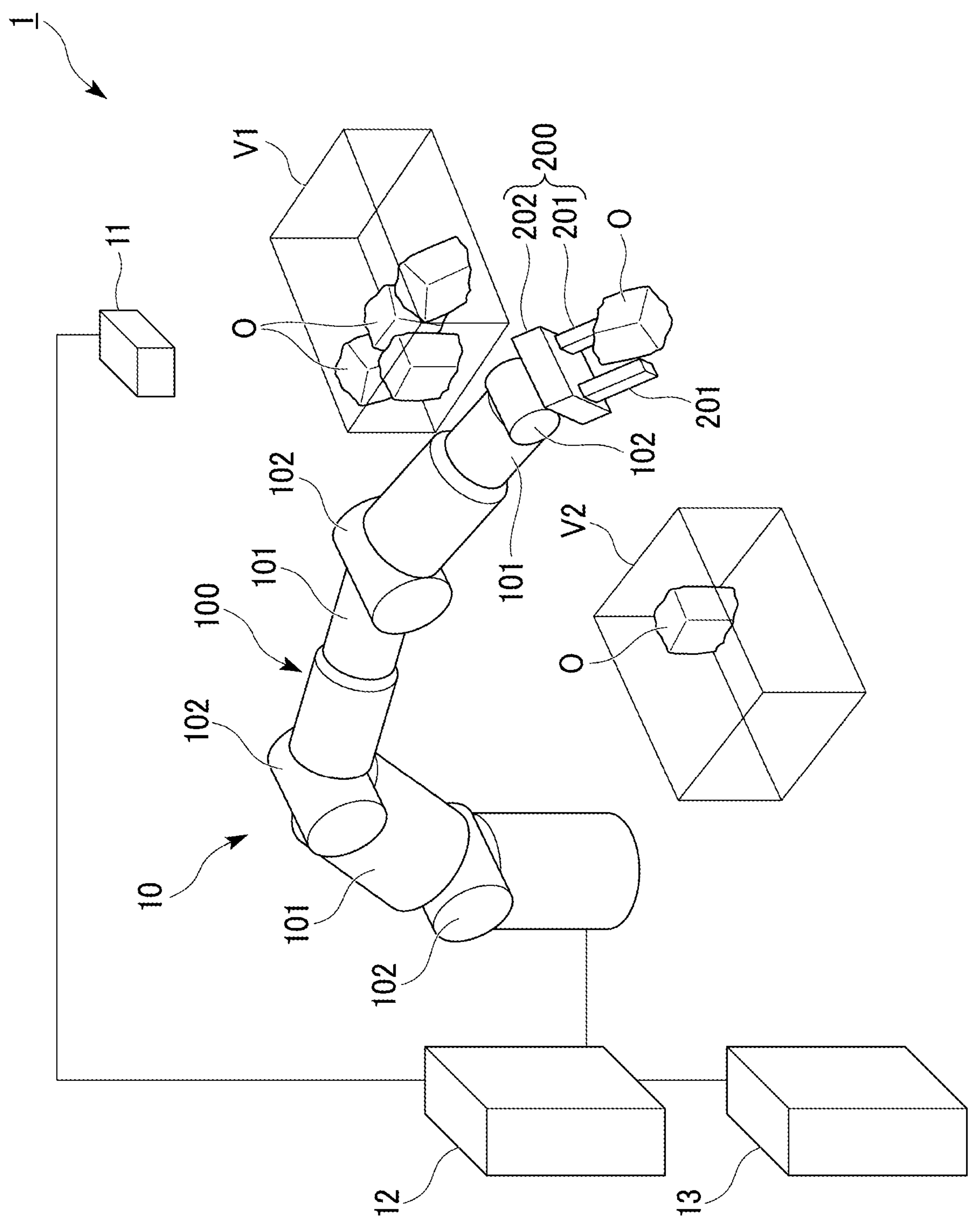
FIG. 1 is a perspective view schematically showing a transport system according to an embodiment.

According to one embodiment, a handling device includes: a holding part that includes two or more supporting parts and is capable of holding an object by gripping the object with the two or more supporting parts; a calculation part configured to calculate a safety factor indicating safety of a state of the holding part holding the object; and a controller configured to cause the holding part to hold the object according to the safety factor.

According to one embodiment, a control device includes: a calculation part that includes two or more supporting parts and is configured to calculate a safety factor indicating safety of a state in which a holding part that can hold an object holds the object by gripping the object with the two or more supporting parts; and a controller configured to cause the holding part to hold the object according to the safety factor.

Various Embodiments will be described hereinafter with reference to the accompanying drawings.

Hereinafter, a handling device of an embodiment will be described with reference to the drawings. In the following description, configurations having the same or similar functions are designated by the same reference numerals. Then, redundant description of those configurations may be omitted. The term "according to XX" as used herein means "according to at least XX" and includes the case according to another element in addition to XX. In addition, "according to XX" is not limited to the case in which XX is directly used, but also includes the case in which according to what is calculated or processed for XX. "XX" is an arbitrary element (for example, arbitrary information).

FIG. 1 is a perspective view schematically showing a transport system 1 including a handling device 10 of the embodiment. The transport system 1 is, for example, a handling system (picking system) for physical distribution. The transport system 1 moves the object O (holding target, transport target) located in the first container V1 to the second container V2.

The first container V1 is, for example, various conveyors, various pallets, shipping containers, or the like. The shipping container is, for example, a tote or an oricon, and widely means a member (for example, a box-shaped member) capable of containing the object O. The first container V1 is not limited to the above example.

Many kinds of objects O having different sizes or weights are randomly placed in the first container V1. For example, the object O to be held has an uneven shape on at least a part of the surface of the object O. In the embodiment, the outline of the object O varies from a small shape such as 5 cm square to a large shape such as 30 cm square. Further, the object O varies from a light object such as several tens of g to a heavy object such as several kg. The size and weight of the object O are not limited to the above example.

The second container V2 is a shipping container such as a tote or an oricon. The second container V2 is not limited to the above example. The handling device 10 and the transport system 1 may move the object O to the second container V2 other than the shipping container.

The handling device 10 and the transport system 1 are not limited to handling systems for physical distribution, but can be widely applied to industrial robot systems or other systems. The handling device and the transportation system of the embodiment are not limited to the devices or systems whose main purpose is to transport an object, but also include devices or systems that involve the transportation (movement) of an object as part of product assembly or other purposes.

The overall configuration of the transport system 1 will be described. As shown in FIG. 1, the transport system 1 includes, for example, a handling device 10, a detection device 11, an operation device 12, and a management device 13.

The handling device 10 is, for example, a robot device. The handling device 10 holds the object O located in the first container V1 and moves the held object O to the second container V2 (storage area). The handling device 10 can communicate with the management device 13 in a wired or wireless manner.

The detection device 11 is arranged near the first container V1. The detection device 11 is arranged, for example, directly above or obliquely above the first container V1. The detection device 11 is, for example, a camera or various sensors. The detection device 11 acquires, for example, information about the object O located in the first container V1 and information about the first container V1.

The information acquired by the detection device 11 is, for example, at least one of image data, range image data, and shape data. The range image data is image data having range information in one or more directions. The distance information indicates, for example, the depth from an arbitrary reference plane set above the first container V1. The shape data is information indicating the outline of the object O and the like. The information detected by the detection device 11 is output to the operation device 12. The information detected by the detection device 11 may be output to the management device 13.

The detection device 11 may be provided as part of the handling device 10. In this case, the information detected by the detection device 11 may be directly output to the operation device 12 of the handling device 10.

The handling device 10 may be configured to be able to acquire information about the object O located in the first container V1 and information about the first container V1 before taking out the object O from the first container V1. In this case, the information regarding the object O located in the first container V1 and the information regarding the first container V1 may not be acquired using the detection device 11.

For example, the information on the object O located in the first container V1 and the information on the first container V1 may be registered in advance in a database on a server (not shown). For example, the operation device 12 or the management device 13 may acquire information regarding the object O located in the first container V1 and information regarding the first container V1 from the database.

For example, the position or orientation of the object O may change due to the occurrence of shaking or the like during the operation of the system. Therefore, the transport system 1 may include a configuration capable of acquiring the latest information regarding the object O and the first container V1.

The transport system 1 may include a second detection device arranged near the second container V2. The second detection device is arranged, for example, immediately above or diagonally above the second container V2. The second detection device is, for example, a camera or various sensors. The second detection device detects, for example, information about the shape of the second container V2 (including the shape of the inner wall surface or the partition) and information about the object O placed first in the second container V2.

The information acquired by the second detection device is, for example, at least one of image data, range image data, and shape data. The second detection device may be provided as part of the handling device 10. In this case, the information detected by the second detection device may be directly output to the operation device 12 of the handling device 10.

The operation device 12 (control device) controls the entire transport system 1. For example, the operation device 12 acquires the information held by the management device 13 and the information detected by the detection device 11, and outputs the acquired information to the handling device 10.

Figure 4:
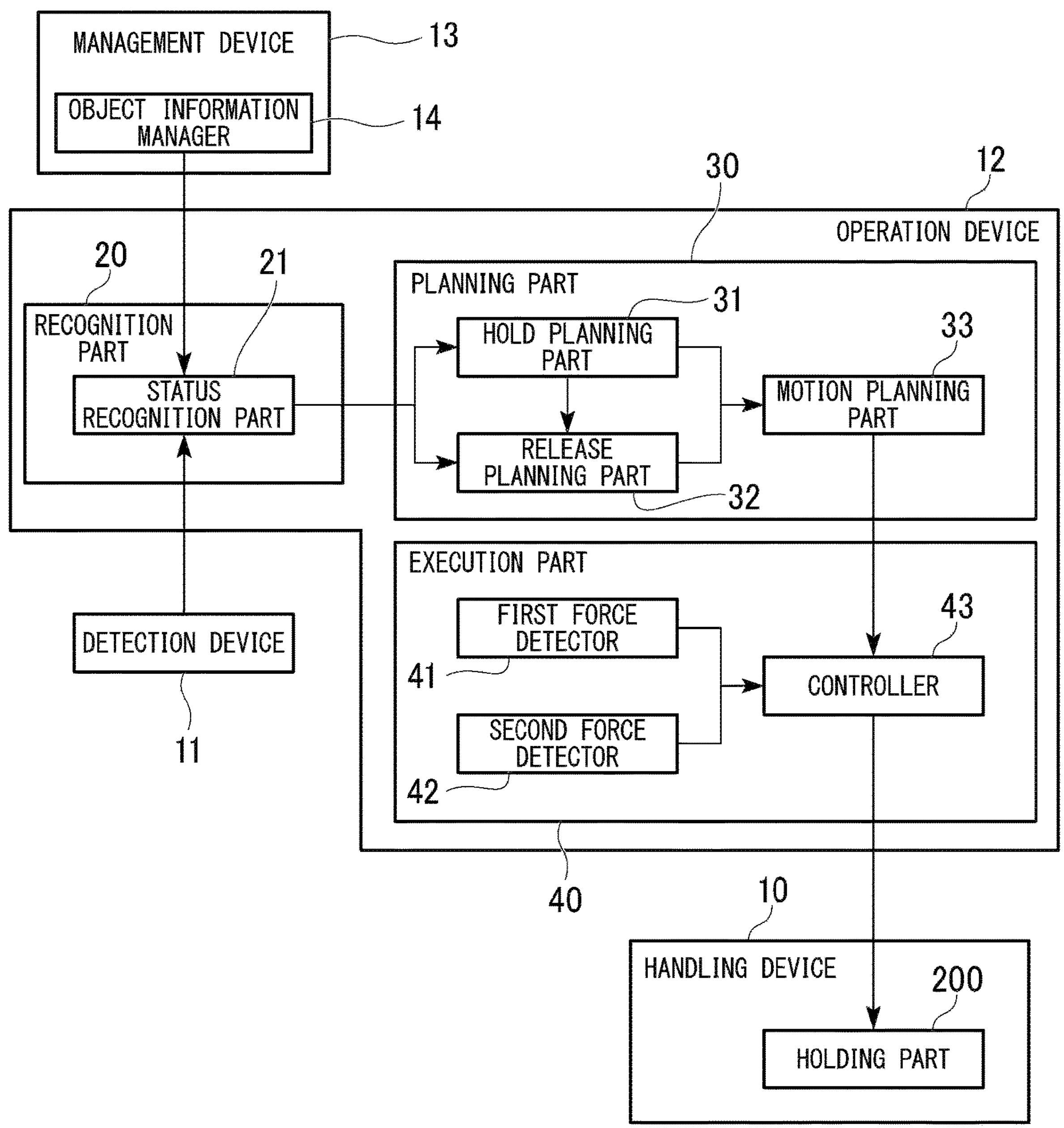
FIG. 4 is a block diagram showing a configuration of a transport system according to an embodiment.

The management device 13 manages the entire transport system 1. As shown in FIG. 4, the management device 13 includes, for example, an object information manager 14 that manages information about the object O. For example, the object information manager 14 acquires information on the object detected by the detection device 11 and manages the acquired information. The transport system 1 may not include the management device 13. For example, the management device 13 may be a device on the communication network. The operation device 12 may communicate with the management device 13 via a network device such as a server.

Next, the handling device 10 will be described. As shown in FIG. 1, the handling device 10 includes, for example, a moving mechanism 100 and a holding part 200.

The moving mechanism 100 moves the holding part 200 to a desired position. For example, the moving mechanism 100 is a 6-axis vertical articulated robot arm. The moving mechanism 100 includes, for example, a plurality of arm members 101 and a plurality of rotating parts 102. The plurality of rotating parts 102 connect the plurality of arm members 101 to each other. The plurality of rotating parts 102 are rotatable about a rotation axis in a first direction and a second direction opposite to the first direction.

The moving mechanism 100 may be a 3-axis orthogonal robot arm. Alternatively, the moving mechanism 100 may be a mechanism that moves the holding part 200 to a desired position by using another configuration. For example, the moving mechanism 100 may be a SCARA robot or a device provided with a direct-acting XYZ stage. The moving mechanism 100 may be a flying body (for example, a drone) that lifts and moves the holding part 200 with a rotary wing.

The holding part 200 is a holding mechanism that holds the object O located in the first container V1. The holding part 200 is connected to the moving mechanism 100. For example, the holding part 200 includes two or more supporting parts 201 and a connecting part 202. The holding part 200 holds the object O by friction holding, for example, by gripping the object O by two or more supporting parts 201. In the following, the example which the holding part 200 includes two supporting parts 201 is demonstrated. The holding part 200 may include three or more supporting parts 201. The connecting part 202 connects the two supporting parts 201 and the moving mechanism 100 to each other.

Figure 2:
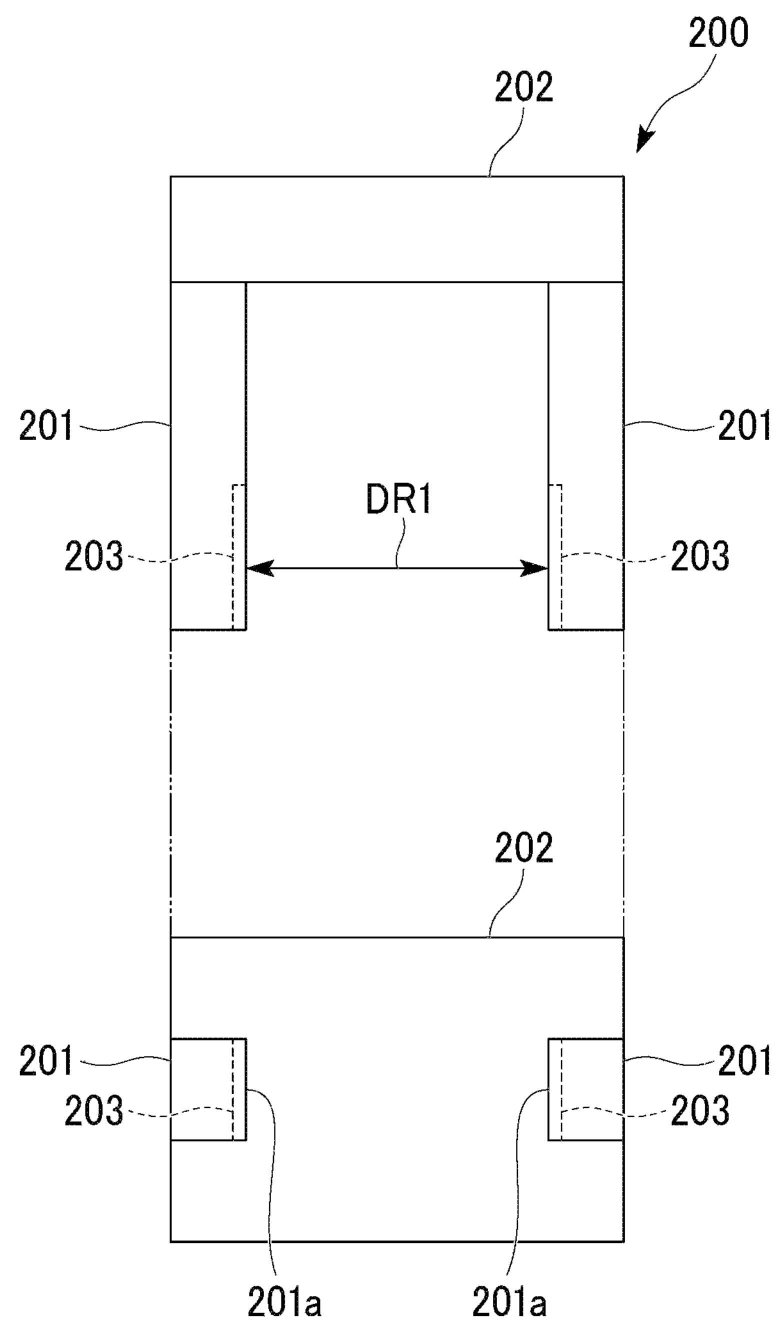
FIG. 2 is a front view and a bottom view of a holding part according to the embodiment.

FIG. 2 is a front view and a bottom view of the holding part 200. A front view of the holding part 200 is arranged on the upper side in FIG. 2, and a bottom view of the holding part 200 is arranged on the lower side in FIG. 2.

Each of the two supporting parts 201 is a rod-shaped finger or nail. The proximal ends of the two supporting parts 201 are connected to the connecting part 202. The two supporting parts 201 are separated from each other in the direction DR1. The distance between the two supporting parts 201 in the direction DR1 is variable. The holding part 200 grips and holds the object O by the two supporting parts 201 by holding the two supporting parts 201 close to each other. The direction in which the two supporting parts 201 approach each other does not have to be parallel to the direction DR1. For example, the two supporting parts 201 hold the object O by making the inner surface 201*a* of each supporting part 201 contact with the object O. The two surfaces 201*a* face each other. The shape of the supporting part 201 is not limited to the example shown in FIG. 2. The supporting part 201 may include a joint for bending the distal end part.

The supporting part 201 includes a sensor 203 such as a strain gauge, a photo sensor, a touch sensor, or a tactile sensor. The sensor 203 is arranged on the surface 201*a* that contacts the object O or inside the supporting part 201.

Figure 3:
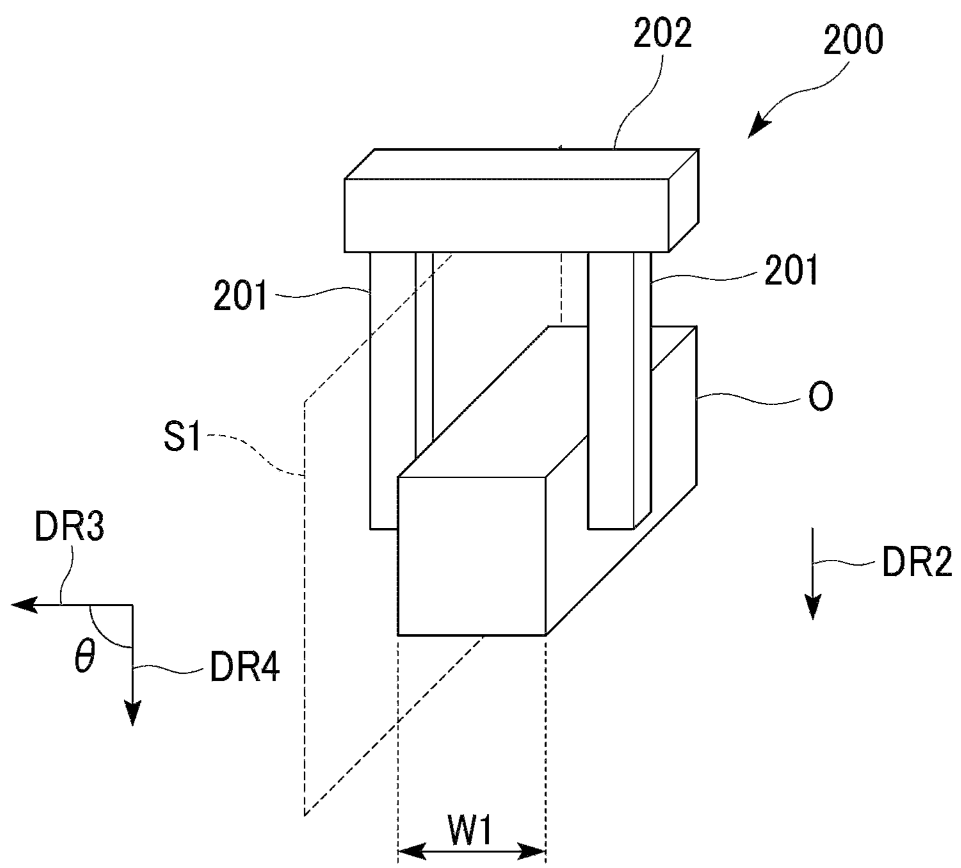
FIG. 3 is a perspective view of a holding part according to the embodiment.

FIG. 3 is a perspective view of the holding part 200. The two supporting parts 201 move in the traveling direction DR2 and are arranged around the object O while the distance between the two supporting parts 201 is kept larger than the width W1 of the object O. After that, the distance between the two supporting parts 201 is reduced so that the two supporting parts 201 contact the object O and grip the object O. Hereinafter, the operation of reducing the distance between the two supporting parts 201 has the same meaning as the operation of closing the two supporting parts 201. FIG. 3 shows a state of the holding part 200 when the two supporting parts 201 grip the object O. The two supporting parts 201 are in contact with the side surface of the object O. At this time, a portion where each supporting part 201 and the object O contact each other forms a contact surface 51.

The normal direction DR3 of the contact surface 51 intersects the vertical direction DR4 (gravitational direction). The angle formed by the normal direction DR3 and the horizontal direction is smaller than the angle θ formed by the normal direction DR3 and the vertical direction DR4. For example, the normal direction DR3 is almost the same as the horizontal direction.

As described above, the detection device 11 for recognizing the object O inside the first container V1 is provided above the first container V1. Due to various errors that occur in the movement work of the object O, some displacement may occur before and after the operation of holding the object O. For example, the handling device 10 moves the held object O and makes it pass in front of an LRF (Laser Range Finder; laser aiming machine) (not shown). Accordingly, the handling device 10 can confirm the holding state of the object O, and can more accurately recognize the positional relationship between the holding part 200 and the object O.

The above LRF is preferably provided, for example, in the vicinity of a movement path when the holding part 200 moves toward the second container V2. In this case, the handling device 10 can confirm the holding state of the object O with a smaller motion. This reduces the operating time of the entire system.

Next, the operation device 12 (control device) will be described. The operation device 12 controls the entire handling device 10. FIG. 4 is a block diagram showing the configuration of the transport system 1. For example, the operation device 12 acquires the information held by the management device 13 and the information detected by the detection device 11, and outputs the acquired information to the handling device 10 (see FIG. 1). The operation device 12 includes, for example, a recognition part 20, a planning part 30, and an execution part 40.

All or part of each functional part (for example, the recognition part 20, the planning part 30, and the execution part 40) of the operation device 12 is realized by one or more processors, such as a CPU (Central Processing Unit) or a GPU (Graphics Processing Unit, Graphics Processor), executing the programs stored in the program memory. However, all or some of these functional parts may be realized by hardware (for example, a circuitry) such as LSI (Large Scale Integration), ASIC (Application Specific Integrated Circuit), FPGA (Field-Programmable Gate Array), and PLD (Programmable Logic Device). Further, all or some of the functional parts may be realized by a combination of the software functional part and hardware. The storage is implemented by a flash memory, an EEPROM (Electrically Erasable Programmable Read-Only Memory), a ROM (Read-Only Memory), a RAM (Random Access Memory), or the like.

Next, each functional part of the operation device 12 will be described. The recognition part 20 acquires information held by the management device 13 and information detected by the detection device 11, and recognizes the states of various elements used for controlling the handling device 10. For example, the recognition part 20 includes a state recognition part 21 that recognizes the states of various elements. For example, the state recognition part 21 generates at least a part of the information regarding the states of various elements by performing a predetermined image processing on the image data or the distance image data. For example, the information on the states of various elements includes object outline information, object position and orientation information, object center of gravity information, and container information. The recognition part 20 outputs these pieces of information to the planning part 30.

The object outline information is, for example, image data of the object O, distance image data of the object O, shape data of the object O, or information generated from at least one of them. The object outline information is information indicating the outline of the object O (object O to be held) located in the first container V1. The object outline information includes, for example, information indicating the outline of the object O when the object O is viewed in the specific direction D1 (see FIG. 1). The specific direction D1 is a direction in which the object O and the holding part 200 are overlapped with each other, for example, at the timing of placing the object O in the second container V2 (for example, the timing immediately before releasing the object O). For example, the object outline information includes information about the plane/non-plane of the object surface. The object outline information may include information indicating the outline of the object O when the object O is viewed in a direction intersecting with the specific direction D1.

Figure 5:
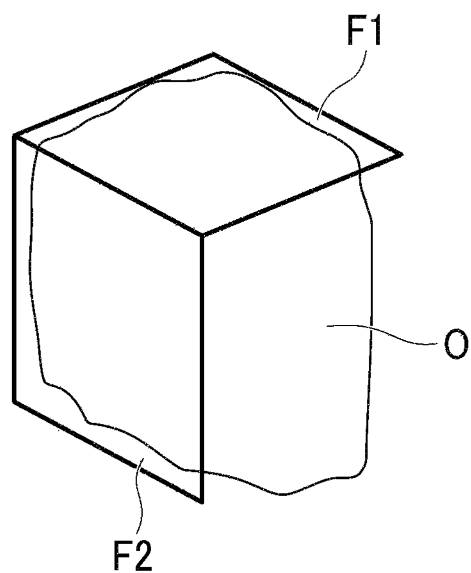
FIG. 5 is a perspective view showing an example of object outline information of the embodiment.
Figure 6:
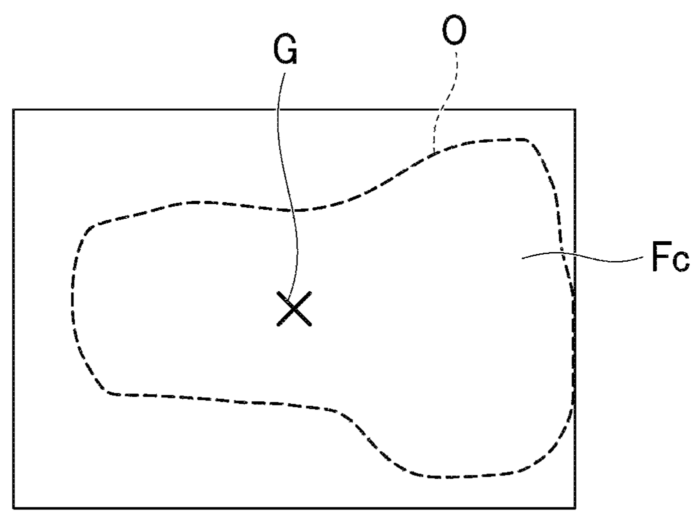
FIG. 6 is a plan view showing an example of object outline information of the embodiment.

For example, the object outline information includes information about the first surface F1 of the rectangular parallelepiped shape circumscribing the object O and the second surface F2 adjacent to the first surface F1 (see FIG. 5). For example, when the object surface is non-planar (when the object surface has irregularities), the state recognition part 21 recognizes the shape of a rectangular parallelepiped circumscribing the outermost convex portion of the object surface as the object outline information (see FIG. 6). For example, the state recognition part 21 recognizes the outline when the object O is viewed in the direction intersecting the specific direction D1 as the holdable area Fc of the object O. The storable area Fc is a flat surface portion on the surface of the object O that the supporting part 201 can hold.

The object position and orientation information is, for example, image data of the object O, range image data of the object O, shape data of the object O, or information generated from at least one of them. The object position and orientation information is information indicating the position and orientation of the object O located in the first container V1. The object position and orientation information includes, for example, information indicating the arrangement position of the object O in the first container V1 and the orientation of the object O (for example, the degree of inclination of the object surface with respect to the horizontal plane).

The object center of gravity information is, for example, image data of the object O, distance image data of the object O, shape data of the object O, weight data of the object O, or information generated from at least one of them. The object center of gravity information is information indicating the center of gravity position G (see FIG. 6) of the object O. For example, the object center of gravity information is position information of the center of gravity of a captured image acquired when the object O is assumed to be formed of the same material. For example, the state recognition part 21 recognizes the gravity position G of the object O according to the three-dimensional information on the assumption that the object O has a uniform density.

The container information includes, for example, movement source shape information, movement destination shape information, and movement destination loading information. The movement source shape information is information indicating the shape of the first container V1 which becomes an obstacle when the holding part 200 holds the object O in the first container V1. The state recognition part 21 recognizes the movement source shape information according to, for example, the information detected by the detection device 11.

The movement destination shape information is information indicating the shape of the second container V2 that becomes an obstacle when the object O is moved to the second container V2. For example, the movement destination shape information is information indicating a wall defining the inner wall surface of the second container V2 and a partition provided inside the second container V2.

The movement destination loading information is information indicating the object O placed first in the second container V2. The state recognition part 21 recognizes the movement destination shape information and the movement destination loading information according to the information detected by the second detection device arranged near the second container V2, for example.

Next, the planning part 30 will be described. For example, the planning part 30 includes a hold planning part 31 (calculation part), a release planning part 32, and a motion planning part 33. The hold planning part 31 generates a holding plan for the holding part 200 to hold the object O in the first container V1. The release planning part 32 generates a release plan for releasing the object O held by the holding part 200 in the second container V2. The motion planning part 33 generates a movement plan for moving the object O held by the holding part 200 to the second container V2. The motion planning part 33 outputs the generated movement plan to the controller 43.

Next, the execution part 40 will be described. For example, the execution part 40 includes a first force detector 41, a second force detector 42, and a controller 43. The first force detector 41 generates first force information indicating the force generated in the moving mechanism 100 according to the detection value output from the force sensor provided in the moving mechanism 100. The first force detector 41 outputs the generated first force information to the controller 43. The second force detector 42 generates a second force indicating the force generated in the supporting part 201 according to the detection value output from the sensor 203 (see FIG. 2) provided in the supporting part 201 of the holding part 200. The second force detector 42 outputs the generated second force information to the controller 43.

The controller 43 executes the holding operation, the transport operation, and the releasing operation of the object O by the holding part 200, according to the movement plan output by the motion planning part 33, the first force information output by the first force detector 41, and the second force information output by the second force detector 42. The controller 43 detects the holding state of the holding part 200 and the contact state between the object O and other surrounding objects, and appropriately executes the retry operation.

The handling device 10 may include at least a part of the recognition part 20, the planning part 30, and the execution part 40 included in the operation device 12. The handling device 10 may include at least the hold planning part 31 and the controller 43.

Next, the processing executed by the hold planning part 31 will be described. For example, the hold planning part 31 calculates a plurality of holding methods in the holding part 200 according to the information output by the state recognition part 21, and outputs a holding plan corresponding to the best holding method among the calculated holding methods to the motion planning part 33.

The hold planning part 31 calculates a safety factor indicating the safety (safety strength) of the state in which the holding part 200 holds the object O. The safety factor indicates the degree of possibility that the object O can be transported without dropping the object O. The hold planning part 31 calculates a safety factor in each of a plurality of states that the holding part 200 can realize. The hold planning part 31 selects any one of the plurality of states according to the safety factor. For example, the hold planning part 31 selects a holding method associated with a safety factor of at least a predetermined value or more. The hold planning part 31 selects, for example, the holding method associated with the highest safety factor. Accordingly, the holding part 200 can stably hold the object and can prevent the object from falling.

Figure 7:
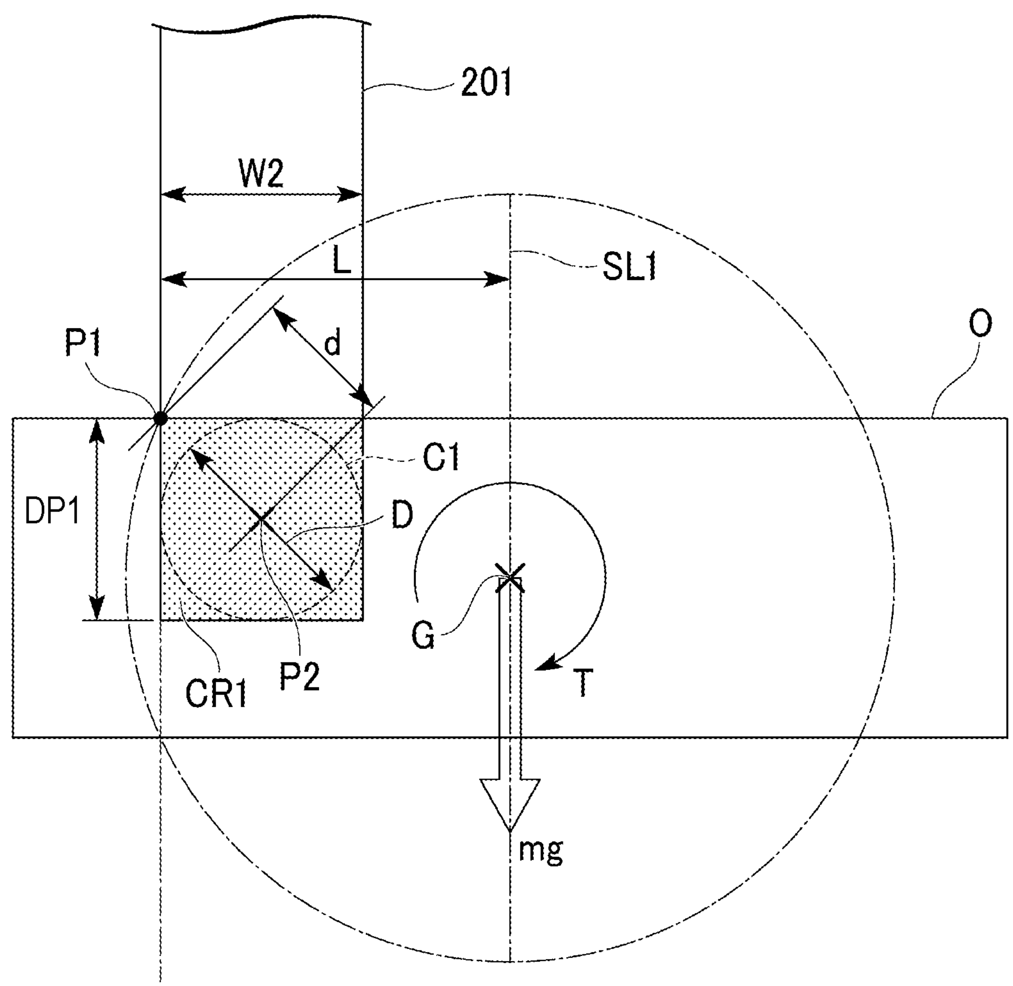
FIG. 7 is a diagram showing parameters used for calculating a safety factor according to the embodiment.

Next, a method for the hold planning part 31 to calculate the safety factor will be described. FIG. 7 is a diagram showing parameters used to calculate the safety factor. FIG. 7 shows a state in which the supporting part 201 and the object O are viewed in a direction in which the supporting part 201 and the object O overlap each other while the holding part 200 holds the object O. For example, the direction is horizontal. Hereinafter, a method of calculating the safety factor when the two supporting parts 201 hold the object O will be described. When the holding part 200 includes three or more supporting parts 201, the hold planning part 31 approximates the holding state of the object O as a state in which the two supporting parts 201 hold the object O, and calculates the safety factor.

The hold planning part 31 calculates the safety factor by using a plurality of parameters. The plurality of parameters include at least diameter D, distance d, length L, and gravity mg.

The diameter D is a parameter related to the size of the region where the supporting part 201 and the object O are in contact with each other. Hereinafter, this area is referred to as a contact area CR1. The diameter D is the diameter of the circle C1 inscribed in the contour of the contact region CR1. In this example, the shape of the contact region CR1 is approximated as a circle C1. In this case, since the area of the contact region CR1 is estimated to be small, the hold planning part 31 can calculate the safety factor in consideration of the possibility that the object O will fall.

The distance d is a parameter related to the position P1 at which the maximum bending stress (torsional stress) occurs in the contact region CR1. The position P1 is the farthest point from the center of gravity position G of the object O on the contour of the contact region CR1. The distance d is the distance between the position P1 and the center position P2 of the contact region CR1.

The length L is a parameter relating to a bending moment (torsion moment) that causes a bending stress in the contact region CR1. The length L indicates the length of the arm in which the bending moment is generated. The length L is the distance between the vertical straight line SL1 passing through the position G of the center of gravity of the object O and the position P1.

Gravity mg is a parameter related to the weight of the object O. Gravity mg is the product of the mass m of the object O and the magnitude g of gravitational acceleration.

The torque T, which is the bending moment generated at the position P1, is represented by the following equation (1).

[Equation 1]

$$T=Lmg \tag{1}$$

The sectional second polar moment Ip of the circle C1 that is an approximate shape of the contact region CR1 is expressed by the following equation (2).

[Equation 2]

$$Ip=\frac{\pi D^4}{32} \tag{2}$$

The bending stress τ generated by the torque T is expressed by the following equation (3).

[Equation 3]

$$\tau=\frac{Td}{2Ip} \tag{3}$$

The friction pressure Fp generated in the contact region CR1 is expressed by the following equation (4).

[Equation 4]

$$Fp=\frac{2\mu f}{A} \tag{4}$$

In the equation (4), the parameter f is the holding force of the supporting part 201, the parameter μ is the friction coefficient according to the object O, and the parameter A is the area of the contact region CR1. In the contact region CR1, the frictional pressure Fp is generated in all directions.

The safety factor Sr is expressed by the following equation (5).

[Equation 5]

$$Sr=\frac{Fp}{\tau} \tag{5}$$

When the vertically downward stress is considered, the safety factor Sr is expressed by the following equation (6).

[Equation 6]

$$Sr=\frac{Fp}{\tau+\text{mg}} \tag{6}$$

The hold planning part 31 calculates the diameter D, the distance d, and the length L according to the object outline information and the object center of gravity information. The recognition part 20 acquires the mass information indicating the mass m of the object O from the object information manager 14 of the management device 13. The hold planning part 31 acquires the mass information from the recognition part 20. The hold planning part 31 calculates the safety factor Sr according to the above equations (1) to (6).

The hold planning part 31 may estimate the torque T according to the detection value output from the sensor 203 of the supporting part 201.

The recognition part 20 may acquire the object information indicating the type of the object O from the object information manager 14 of the management device 13. The hold planning part 31 may acquire the object information from the recognition part 20. The hold planning part 31 may calculate the diameter D and the area A according to the object information.

Figure 8A:
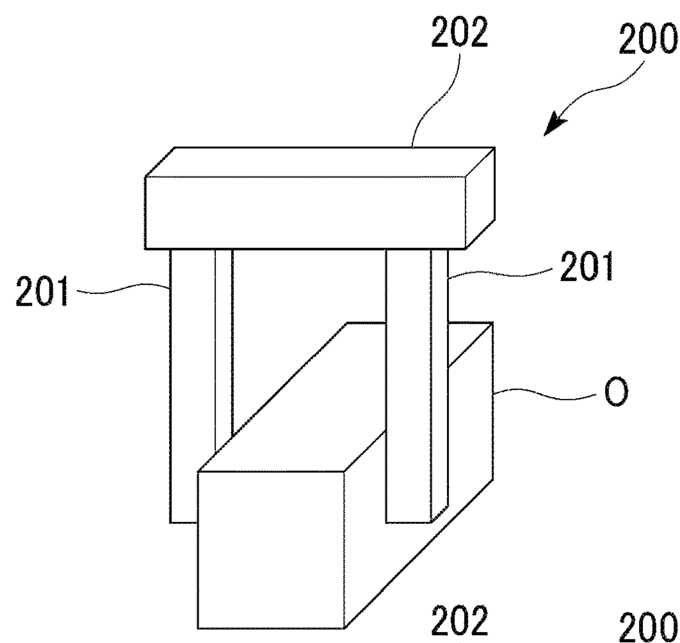
FIGS. 8A, 8B, and 8C are diagrams showing a state in which the holding part of the embodiment holds an object.
Figure 8B:
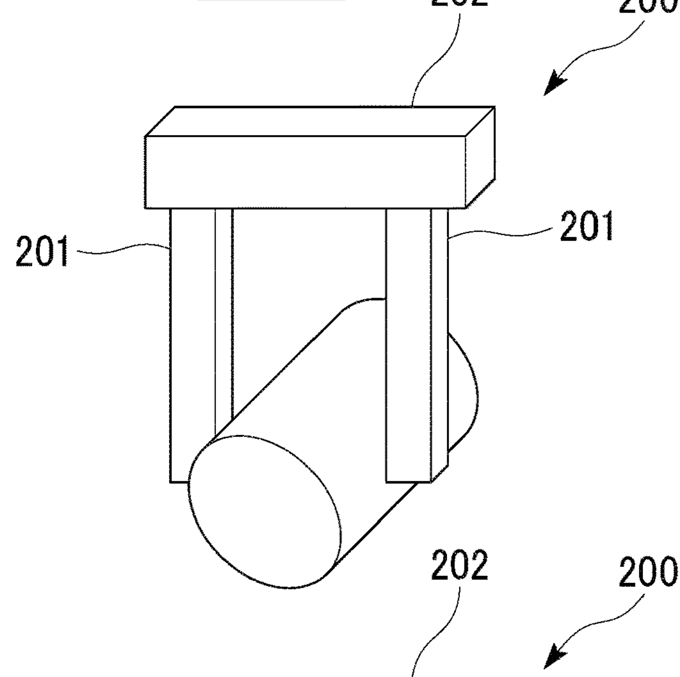
Figure 8C:
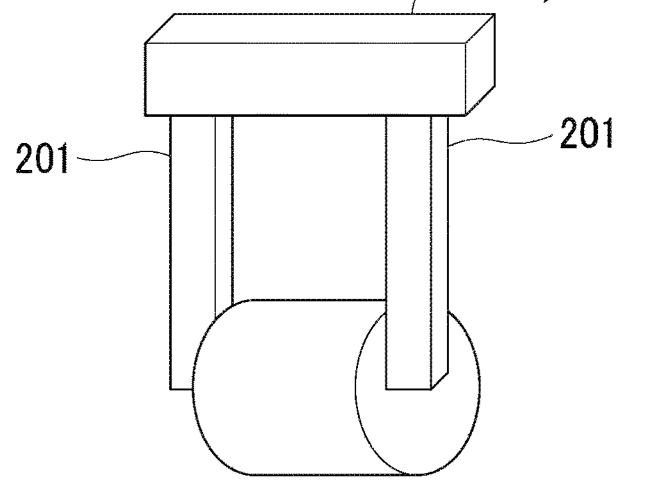

Hereinafter, an example in which the diameter D and the area A are calculated for each type of the object O will be described. FIGS. 8A, 8B, and 8C show a state in which the holding part 200 holds the object O.

FIG. 8A shows an example in which the object O is a rectangular parallelepiped. By using the width W2 of the supporting part 201 (see FIG. 7) and the depth DP1 of the supporting part 201 (see FIG. 7), the diameter D and the area A are represented by the equations (7) and (8), respectively.

[Equation 7]

$$A=W2\times DP1 \tag{7}$$

$$D=\sqrt{W2^2+DP1^2} \tag{8}$$

FIG. 8B shows an example in which the object O is a cylinder and the holding part 200 holds the curved side surface of the cylinder. By using the width W2 of the supporting part 201 and the depth DP1(const) of the supporting part 201, the area A is represented by the equation (9).

[Equation 8]

$$A=W2\times DP1(\text{const}) \tag{9}$$

When the holding part 200 holds the curved surface of the cylinder, the width of the contact region CR1 in the vertical direction is very small. Therefore, an approximate value (for example, 5 mm) is used as the depth DP1(const) of the supporting part 201. In this case, for example, 5 mm is used as the approximate value of the diameter D.

FIG. 8C shows an example in which the object O is a cylinder and the holding part 200 holds the flat side surface of the cylinder. By using the width W2 of the supporting part 201 and the depth DP1 of the supporting part 201, the diameter D and the area A are represented by the equations (10) and (11), respectively.

[Equation 9]

$$A=W2\times DP1\times 0.8 \tag{10}$$

$$D=\sqrt{(W2^2+DP1^2)\times 0.8} \tag{11}$$

The holding part 200 may hold an object O that does not have a fixed shape. When the object O does not have a fixed shape and is deformed, by using the width W2 of the supporting part 201 and the depth DP1 of the supporting part 201, the diameter D and the area A may be represented by the equations (12) and (13), respectively.

[Equation 10]

$$A=W2\times DP1\times 0.5 \tag{12}$$

$$D=(W2^2+DP1^2)\times 0.5 \tag{13}$$

When the object O does not have a fixed shape and is not deformed, by using the width W2 of the supporting part 201 and the depth DP1 of the supporting part 201, the diameter D and the area A may be represented by the equations (14) and (15), respectively.

[Equation 11]

$$A=W2\times DP1\times 0.3 \tag{14}$$

$$D=\sqrt{(W2^2+DP1^2)\times 0.3} \tag{15}$$

The hold planning part 31 repeatedly calculates the safety factor by changing at least one value of the plurality of parameters. Accordingly, the hold planning part 31 calculates a plurality of safety factors corresponding to a plurality of states. The hold planning part 31 can calculate the diameter D and the area A by using a fixed form corresponding to the type of object. Therefore, the hold planning part 31 can calculate the diameter D and the area A at high speed.

As described above, the hold planning part 31 selects the holding method associated with the calculated safety factor. The holding method is defined at least by the holding position. The holding position indicates a position where the supporting part 201 contacts the object O when the holding part 200 holds the object O. For example, the holding position is defined by the length L and the depth DP1 shown in FIG. 7.

Figure 9A:
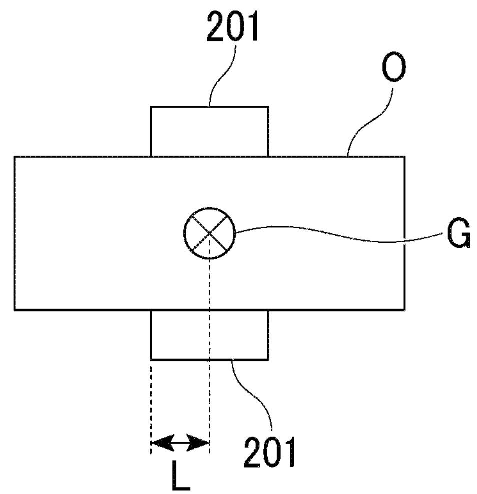
FIGS. 9A, 9B, and 9C are diagrams showing a state in which the holding part of the embodiment holds an object.
Figure 9B:
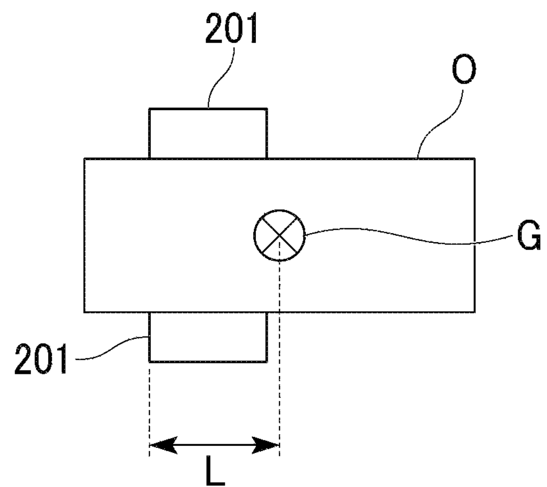
Figure 9C:
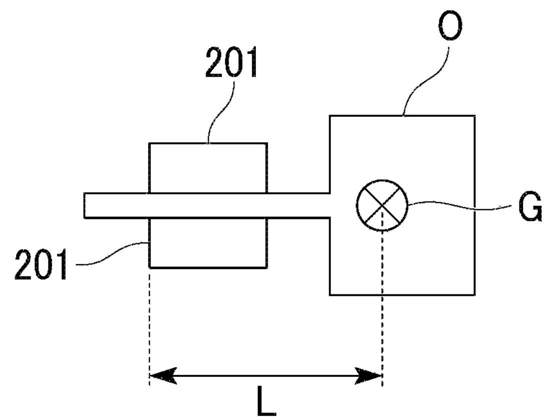

FIGS. 9A, 9B, and 9C show a state in which the holding part 200 holds the object O. Each figure shows the state of the object O and the two supporting parts 201 when the object O and the two supporting parts 201 are viewed in the traveling direction DR2 (see FIG. 3) of the two supporting parts 201. In each figure, the length L of the arm in which the bending moment is generated is shown.

FIG. 9A shows a state in which the holding part 200 holds a position near the center of gravity G of the object O. FIGS. 9B and 9C show a state in which the holding part 200 holds a position far from the center of gravity position G, as compared with FIG. 9A.

A position close to the center of gravity G of the object O is not always the optimum holding position. For example, the width of the object O around the center of gravity G may be larger than the maximum distance between the two supporting parts 201. Since the width of the object O is small at the position away from the center of gravity position G, the holding part 200 can hold the object O at that position. Alternatively, the object O may be easily deformed around the center of gravity position G. When the object O is not easily deformed at the position away from the center of gravity position G, the holding part 200 can safely hold the object O at that position. Alternatively, the friction coefficient of the object O may be small around the center of gravity position G. When the friction coefficient of the object O is large at the position away from the center of gravity position G, the holding part 200 can safely hold the object O at that position.

Figure 10:
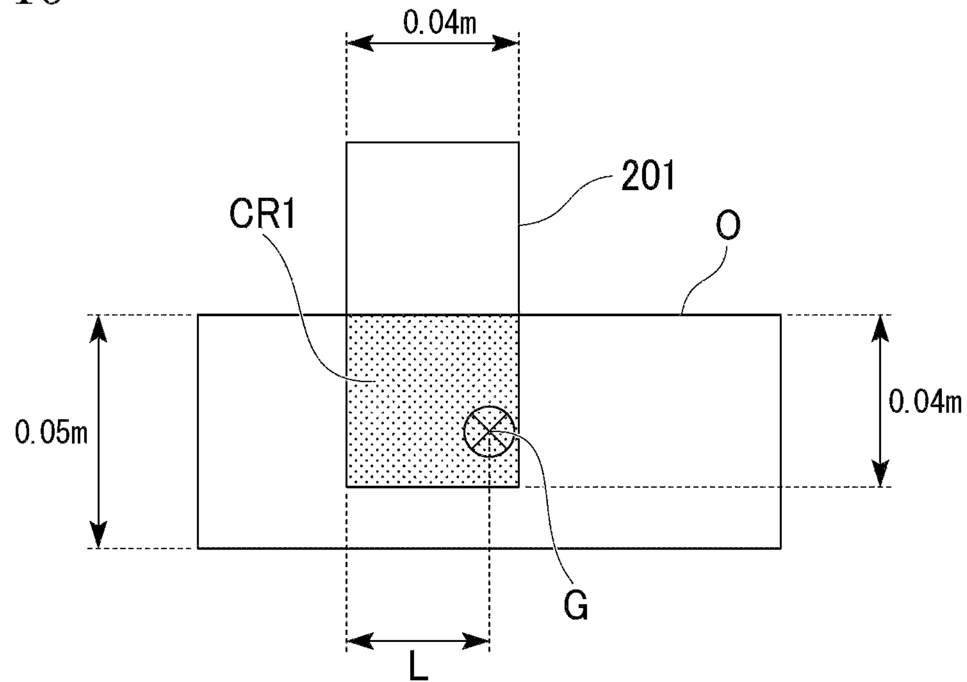
FIG. 10 is a diagram showing an example of parameters used for calculating a safety factor according to the embodiment.

Next, an example of the calculated safety factor will be described. Hereinafter, an example in which the object O is a rectangular parallelepiped will be described. FIG. 10 shows an example of parameters used to calculate the safety factor.

The vertical width and the horizontal width of the contact region CR1 are 0.04 m. Therefore, the diameter D of the circle inscribed in the contour of the contact region CR1 is 0.04 m. The vertical width (thickness) of the object O is 0.05 m. The length L (see FIG. 7) corresponding to the position of the holding part 200 is the distance between the center of gravity position G of the object O and the predetermined position of the supporting part 201. The predetermined position is the point farthest from the center of gravity G of the object O. The mass of the object O is 500 g.

Figure 11:
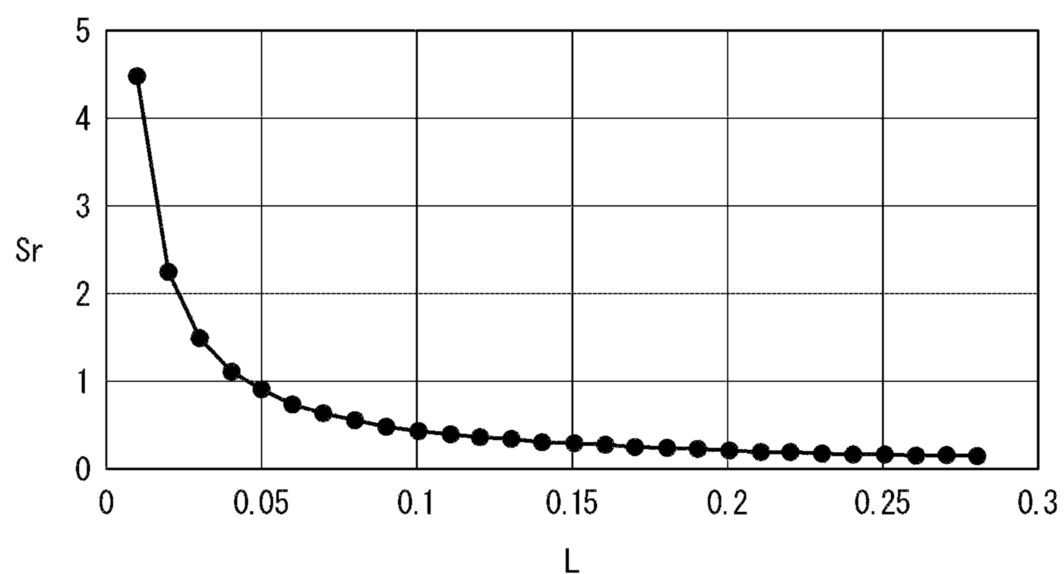
FIG. 11 is a graph showing the relationship between the position of the holding part and the safety factor in the embodiment.

FIG. 11 is a graph showing the relationship between the position (length L) of the holding part 200 and the safety factor Sr. The horizontal axis of the graph shown in FIG. 11 shows the length L, and the vertical axis of the graph shown in FIG. 11 shows the safety factor Sr.

When the position of the holding part 200 is close to the center of gravity G of the object O, the safety factor Sr is relatively large. Therefore, the holding part 200 can safely hold the object O. When the position of the holding part 200 is far from the center of gravity G of the object O, the safety factor Sr is relatively small. Therefore, the object O is relatively likely to fall. For example, the hold planning part 31 determines that the state associated with the safety factor Sr of 3 or more is safe. The hold planning part 31 selects a state having the largest safety factor Sr among the safe states, and outputs the holding method corresponding to the state to the motion planning part 33.

Figure 12:
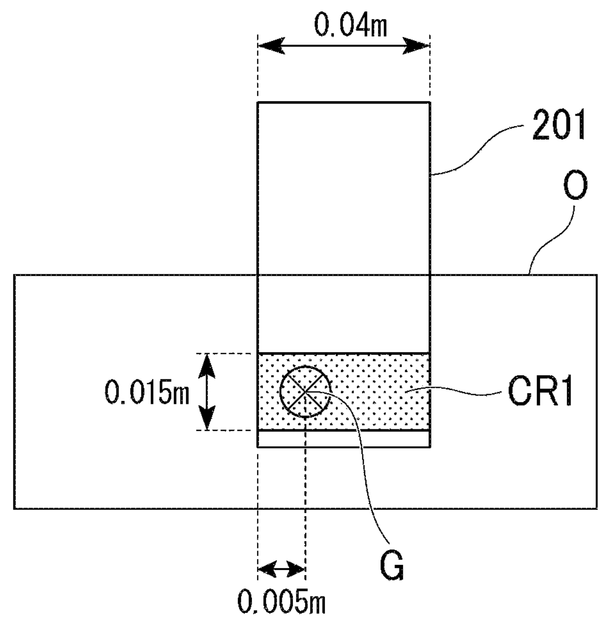
FIG. 12 is a diagram showing an example of parameters used for calculating a safety factor according to the embodiment.

In the following, an example will be described in which the object O is a cylinder and the holding part 200 holds the curved side surface of the cylinder. FIG. 12 shows an example of parameters used to calculate the safety factor.

The horizontal width of the contact region CR1 is 0.04 m. The approximate value of the vertical width of the contact region CR1 is 0.015 m. Therefore, the diameter D of the circle inscribed in the contour of the contact region CR1 is 0.015 m. The position of the holding part 200 is a point separated from the center of gravity G of the object O by 0.005 m. The mass of the object O is 500 g.

Figure 13:
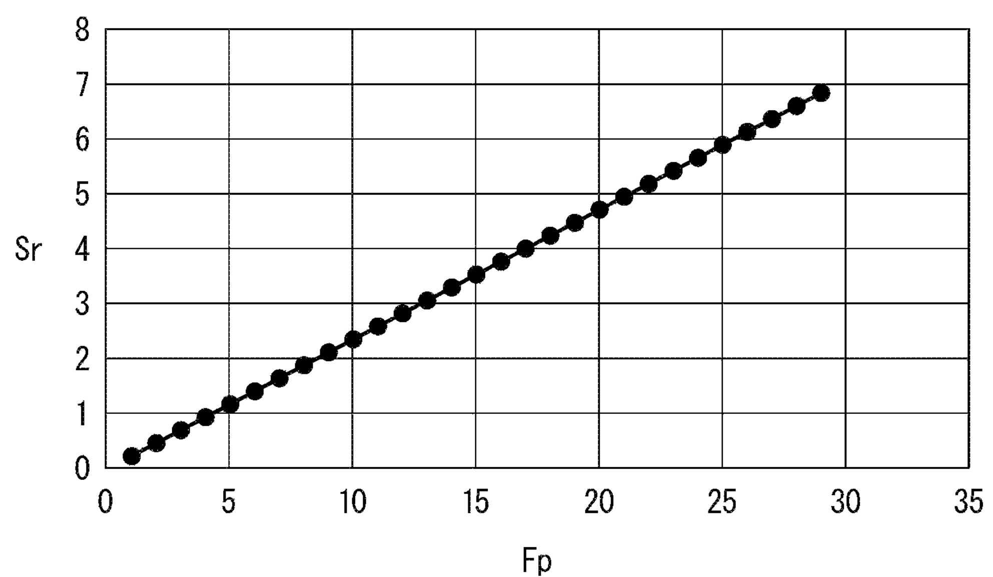
FIG. 13 is a graph showing the relationship between friction pressure and safety factor in the embodiment.

FIG. 13 is a graph showing the relationship between the friction pressure Fp and the safety factor Sr. The horizontal axis of the graph shown in FIG. 13 shows the friction pressure Fp, and the vertical axis of the graph shown in FIG. 13 shows the safety factor Sr.

When the friction pressure Fp is large, the safety factor Sr is relatively large. When the friction pressure Fp is small, the safety factor Sr is relatively small.

The hold planning part 31 applies a general image processing method to the image data and the like acquired from the recognition part 20. Thereby, the hold planning part 31 detects the contour of the object or the position of the depression. Further, the hold planning part 31 calculates the safety factor according to the design information such as the opening width of the supporting part 201 and plans the holding method. The controller 43 advances the two supporting parts 201 from above the object O toward the object O according to a good holding method. When the two supporting parts 201 come to the predetermined positions, the controller 43 closes the two supporting parts 201. As a result, the holding part 200 grips and holds the object O.

For example, the hold planning part 31 may treat the safety factor as the most important index and select the holding method. Alternatively, the hold planning part 31 may select the holding method according to the index acquired by linearly combining the safety factor and another index. For example, another index is the position of the object O, the orientation that the robot can take, or the like.

For example, when the area of the contact region CR1 is large, the hold planning part 31 may generate a holding plan that holds the object O at a position farther from the center of gravity position G of the object O. In this case, the distance between the actual holding position and the center of gravity position G is larger than the distance between the holding position and the center of gravity position G according to the best safety factor. When the area of the contact region CR1 is small, the hold planning part 31 may generate a holding plan that holds the object O at a position closer to the gravity center position G of the object O. In this case, the distance between the actual holding position and the center of gravity position G is smaller than the distance between the holding position and the center of gravity position G according to the best safety factor.

The shape of the supporting part 201 may be a claw shape. In this case, inclusion holding and friction holding are realized at the same time. When the claws of the supporting part 201 contact the object O, the hold planning part 31 may multiply the safety factor calculated as described above by a predetermined coefficient. For example, the predetermined coefficient is greater than 1.

As described above, the hold planning part 31 calculates the safety rate in each of the plurality of states that the holding part 200 can realize. The motion planning part 33 may start generating the movement plan when the hold planning part 31 calculates at least one safety factor. For example, when the hold planning part 31 calculates a high safety factor that allows the object O to move at high speed, the motion planning part 33 may start generating a movement plan for high-speed movement. At this time, the hold planning part 31 may continue to calculate the safety factor in a state in which the safety factor has not been calculated yet.

There may be a high relationship between the shape of the object O and the optimal holding method. The hold planning part 31 may execute machine learning (deep learning or the like) in which the information (image data or the like) output by the state recognition part 21 is input and the optimal holding method is output. The hold planning part 31 may store the learning model acquired through machine learning in the memory in the operation device 12. In the learning model, information such as image data and the optimal holding method are associated with each other. The hold planning part 31 may estimate the holding method according to the information output by the state recognition part 21 and the learning model stored in the memory. Thereby, the hold planning part 31 can generate the holding plan at high speed.

The variable used to calculate the safety factor may be output through machine learning instead of the holding method. For example, the variable is the diameter D, the distance d, or the length L shown in FIG. 7. The hold planning part 31 may calculate the variable according to the information output by the state recognition part 21 and the learning model stored in the memory.

Figure 14:
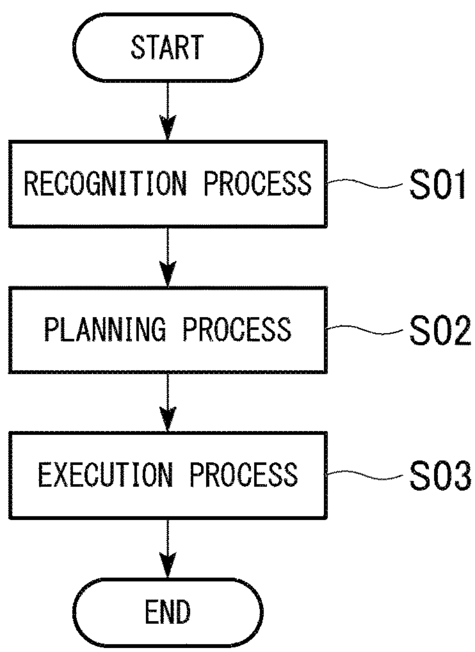
FIG. 14 is a flowchart showing an example of a processing flow of the operation device according to the embodiment.

Next, an example of the processing flow of the operation device 12 will be described. FIG. 14 is a flowchart showing an example of the processing flow of the operation device 12.

The recognition part 20 acquires the information held by the management device 13 and the information detected by the detection device 11, and recognizes the states of various elements used for controlling the handling device 10 (recognition process, step S01 in FIG. 14). For example, the recognition part 20 performs predetermined image processing on the image data or the distance image data, to generate the object outline information, the object position and orientation information, the object center of gravity information, and the container information as information about the states of various elements. The recognition part 20 outputs these pieces of information to the planning part 30.

The planning part 30 generates a holding plan, a release plan, and a movement plan (planning process, step S02 in FIG. 14). The planning part 30 outputs the generated holding plan, release plan, and movement plan to the execution part 40.

The execution part 40 is according to the movement plan output by the planning part 30, the force information output by the first force detector 41, and the second force information output by the second force detector 42. Then, the holding operation, the transport operation, and the releasing operation of the object O by the holding part 200 are executed (execution processing, step S03 in FIG. 14). The execution part 40 detects the holding state of the holding part 200 and the contact state between the object O and other surrounding objects, and appropriately executes the retry operation.

Figure 15:
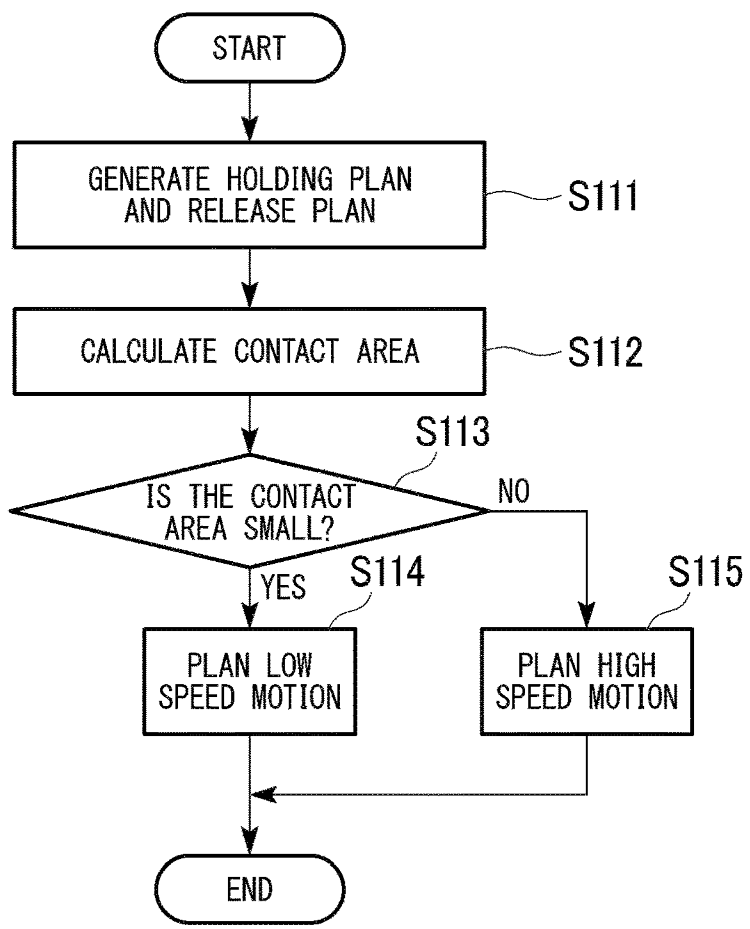
FIG. 15 is a flowchart showing an example of the flow of a planning process of the operation device according to the embodiment.

FIG. 15 is a flowchart showing an example of the flow of the planning process. The planning part 30 executes the planning process shown in FIG. 15 in step S02 of FIG. 14.

The planning part 30 (hold planning part 31 and release planning part 32) generates a holding plan and a release plan (step S111 in FIG. 15).

After step S111, the planning part 30 (hold planning part 31) calculates the contact area indicating the area of the region where the holding part 200 and the object O come into contact with each other (step S112 in FIG. 15). For example, the planning part 30 calculates the contact area according to the object outline information and the like in step S112.

After step S112, the planning part 30 (motion planning part 33) compares the contact area with a predetermined threshold and determines whether the contact area is smaller than the threshold (step S113 in FIG. 15).

When the planning part 30 determines that the contact area is smaller than the threshold value in step S113, the planning part 30 (motion planning part 33) plans the motion method for moving the holding part 200 at a low speed (step S114 in FIG. 15). When the contact area is small, the object O is more likely to drop during the transportation process than when the contact area is large. Therefore, in step S114, the planning part 30 plans a motion method for moving the holding part 200 at a low speed and generates a movement plan indicating the motion method. After that, in the execution process shown in step S03 of FIG. 14, the holding part 200 moves at a low speed.

When the planning part 30 determines that the contact area is equal to or more than the threshold value in step S113, the planning part 30 (motion planning part 33) plans the motion method for moving the holding part 200 at high speed (step S115 in FIG. 15). When the contact area is large, the object O is unlikely to drop during the transportation process. Therefore, in step S115, the planning part 30 plans a motion method for moving the holding part 200 at a high speed and generates a movement plan indicating the motion method. After that, in the execution process shown in step S03 of FIG. 14, the holding part 200 moves at high speed. At this time, the movement speed of the holding part 200 is higher than the movement speed in the movement plan generated in step S114.

Figure 16:
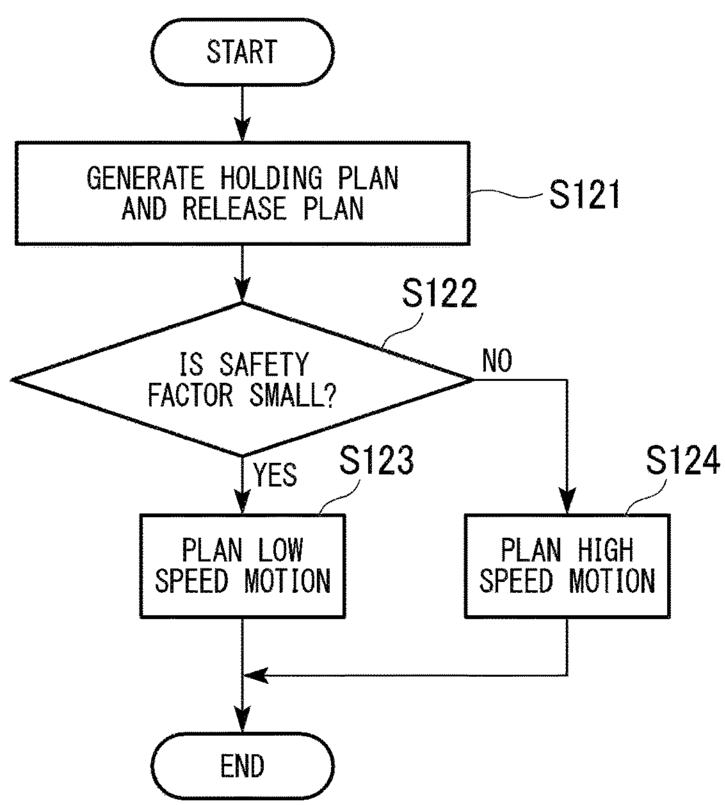
FIG. 16 is a flowchart showing an example of the flow of a planning process of the operation device according to the embodiment.

FIG. 16 is a flowchart showing another example of the flow of the planning process. The planning part 30 executes the planning process shown in FIG. 16 in step S02 of FIG. 14.

The planning part 30 (hold planning part 31 and release planning part 32) generates a holding plan and a release plan (step S121 in FIG. 16).

After step S121, the planning part 30 (motion planning part 33) compares the safety factor with a predetermined threshold and determines whether the safety factor is smaller than the threshold (step S122 in FIG. 16). The threshold value used in step S122 is different from the predetermined value for selecting the holding method of the holding part 200. For example, the threshold value is larger than the predetermined value.

When the planning part 30 determines that the safety factor is smaller than the threshold value in step S122, the planning part 30 (motion planning part 33) plans the motion method for moving the holding part 200 at a low speed (step S123 in FIG. 16). When the safety factor is low, the object O is more likely to drop during the transportation process than when the safety factor is high. Therefore, in step S123, the planning part 30 plans a motion method for moving the holding part 200 at a low speed and generates a movement plan indicating the motion method. After that, in the execution process shown in step S03 of FIG. 14, the holding part 200 moves at a low speed.

When the planning part 30 determines that the safety factor is equal to or higher than the threshold value in step S122, the planning part 30 (motion planning part 33) plans the motion method for moving the holding part 200 at high speed (step S124 in FIG. 16). When the safety factor is high, the object O is unlikely to drop during the transportation process. Therefore, in step S124, the planning part 30 plans a motion method for moving the holding part 200 at a high speed, and generates a movement plan indicating the motion method. After that, in the execution process shown in step S03 of FIG. 14, the holding part 200 moves at high speed. At this time, the movement speed of the holding part 200 is higher than the movement speed in the movement plan generated in step S123.

Figure 17:
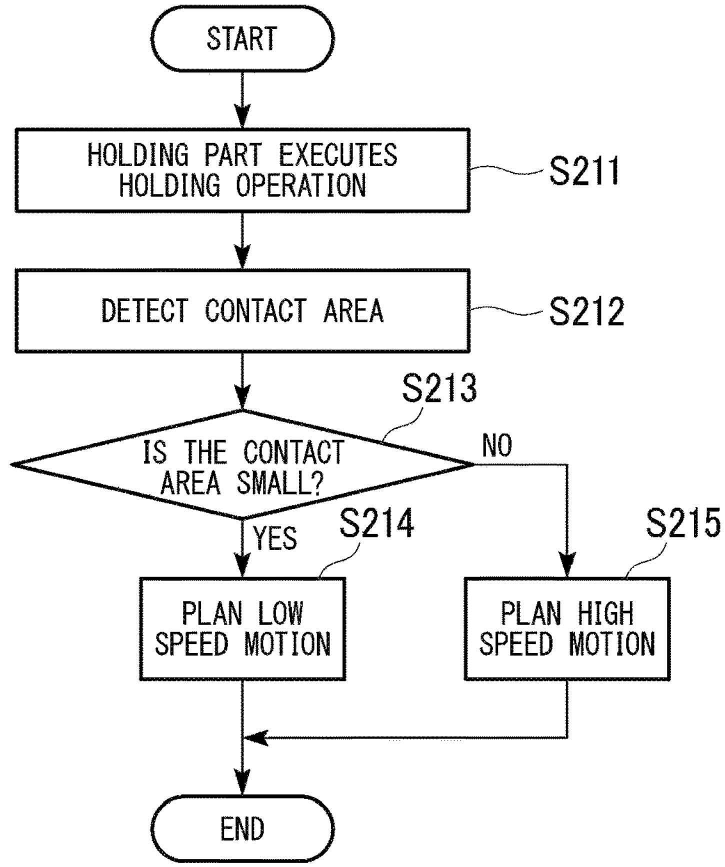
FIG. 17 is a flowchart showing an example of the flow of an execution process of the operation device according to the embodiment.

FIG. 17 is a flowchart showing an example of the flow of execution processing. The execution part 40 executes the execution process shown in FIG. 17 in step S03 of FIG. 14.

The execution part 40 (controller 43) causes the holding part 200 to execute the holding operation according to the holding plan. The holding part 200 holds the object O (step S211 in FIG. 17).

After step S211, the execution part 40 (controller 43) detects the contact area indicating the area of the area where the holding part 200 and the object O contact each other (step S212 in FIG. 17). For example, the execution part 40 detects the contact area according to the force information generated by the second force detector 42 in step S212.

After step S212, the execution part 40 (controller 43) compares the contact area with a predetermined threshold value and determines whether the contact area is smaller than the threshold value (step S213 in FIG. 17).

When the execution part 40 determines in step S213 that the contact area is smaller than the threshold value, the execution part 40 (controller 43) moves the holding part 200 at a low speed (step S214 in FIG. 17). As a result, the holding part 200 moves at a low speed.

When the execution part 40 determines in step S213 that the contact area is equal to or larger than the threshold value, the execution part 40 (controller 43) moves the holding part 200 at high speed (step S215 in FIG. 17). As a result, the holding part 200 moves at high speed. At this time, the moving speed of the holding part 200 is higher than the moving speed in step S214.

Figure 18:
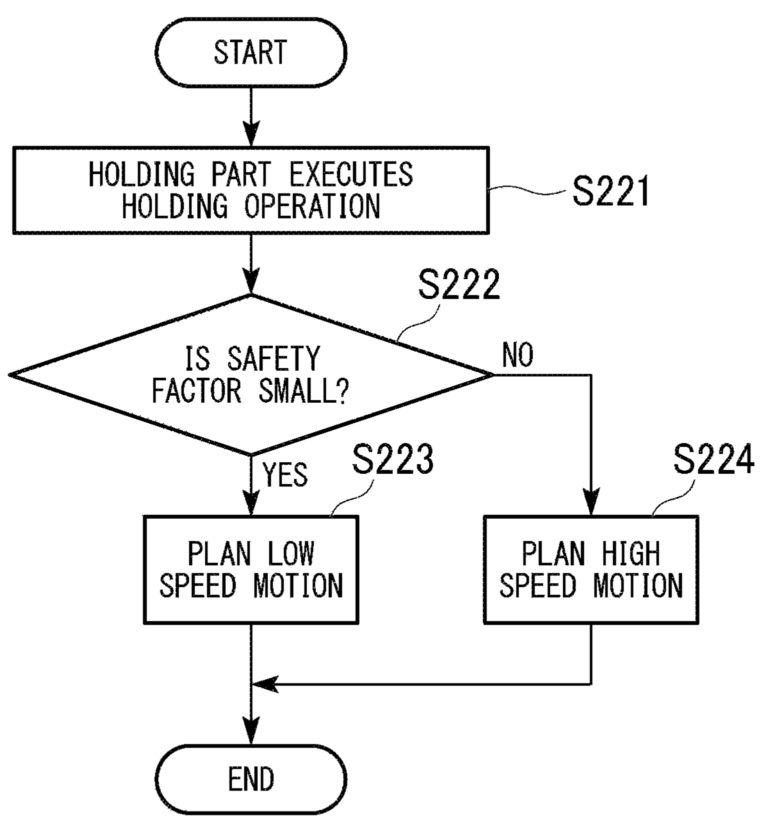
FIG. 18 is a flowchart showing an example of the flow of an execution process of the operation device according to the embodiment.

FIG. 18 is a flowchart showing another example of the flow of execution processing. The execution part 40 executes the execution process shown in FIG. 18 in step S03 of FIG. 14.

The execution part 40 (controller 43) causes the holding part 200 to execute the holding operation according to the holding plan. The holding part 200 holds the object O (step S221 in FIG. 18).

After step S221, the execution part 40 (controller 43) compares the safety factor with a predetermined threshold and determines whether the safety factor is smaller than the threshold (step S222 in FIG. 18).

In a case where the execution part 40 determines that the safety factor is smaller than the threshold value in step S222, the execution part 40 (controller 43) moves the holding part 200 at low speed (step S223 in FIG. 18). As a result, the holding part 200 moves at a low speed.

In a case where the execution part 40 determines that the safety factor is equal to or higher than the threshold value in step S222, the execution part 40 (controller 43) moves the holding part 200 at high speed (step S224 in FIG. 18). As a result, the holding part 200 moves at high speed. At this time, the moving speed of the holding part 200 is higher than the moving speed in step S223.

When the holding part 200 accelerates, the combined vector is defined by combining the gravity direction vector and the acceleration vector. When the holding part 200 accelerates, the direction of gravity can be regarded as the direction of its combined vector. The planning part 30 may calculate the safety factor according to the direction of the combined vector. The execution part 40 may move the holding part 200 according to the direction of the combined vector.

After the holding part 200 holds the object O, the execution part 40 (controller 43) may move the holding part 200 in the direction in which the torsion load is small. For example, in the example shown in FIG. 7, since the supporting part 201 holds the object O at a position on the left side of the center of gravity G of the object O, a clockwise bending moment is generated around the center of gravity G. Therefore, the execution part 40 may move the holding part 200 to the right.

The execution part 40 (controller 43) may control the holding force of the holding part 200 according to the weight of the object O. For example, when the weight of the object O is large, the execution part 40 may increase the holding force of the holding part 200. When the weight of the object O is small, the execution part 40 may reduce the holding force of the holding part 200.

The execution part 40 (controller 43) may control the holding force of the holding part 200 according to the moving speed of the holding part 200. For example, when the moving speed of the holding part 200 is high, the execution part 40 may increase the holding force of the holding part 200. When the moving speed of the holding part 200 is low, the execution part 40 may reduce the holding force of the holding part 200.

According to the embodiment, the handling device 10 includes the holding part 200, the hold planning part 31, and the controller 43. The holding part 200 includes two or more supporting parts 201 and can hold the object O by gripping the object O between the two or more supporting parts 201. The hold planning part 31 calculates a safety factor indicating the safety of the state in which the holding part 200 holds the object O. The controller 43 causes the holding part 200 to hold the object O according to the safety rate. Since the object O is held according to the safety factor calculated by the hold planning part 31, a safer holding method may be selected than the method of holding the object O at a position close to the center of gravity of the object O. Therefore, the handling device 10 can stably hold the object O.

The hold planning part 31 calculates the safety factor is d according to a value (diameter D in FIG. 7) related to the area of a region (contact region CR1 in FIG. 7) where the supporting part 201 and the object O contact each other, and the distance (length L in FIG. 7) between a reference position (position P1 in FIG. 7) in the region and the center of gravity of the object O (position Gin FIG. 7). Since the area of the region where the supporting part 201 and the object O contact each other and the distance of the region from the center of gravity of the object O are considered, the handling device 10 can hold the object O more stably.

The hold planning part 31 calculates the safety factor according to the friction pressure generated in the region (contact region CR1 in FIG. 7) where the supporting part 201 and the object O are in contact with each other. Since the safety factor is calculated according to the friction pressure, the handling device 10 can realize friction holding for stably holding the object O.

The handling device 10 includes a motion planning part 33 that plans a motion method including the moving speed of the holding part 200. The motion planning part 33 determines the moving speed according to the area of a region (contact region CR1 in FIG. 7) where the supporting part 201 and the object O are in contact with each other. The controller 43 operates the holding part 200 according to the motion method planned by the motion planning part 33. In a case where the area of the contact area between the supporting part 201 and the object O is large, the holding part 200 holds the object O in a relatively stable state. In a case where the area of the region where the supporting part 201 and the object O contact each other is small, the holding part 200 holds the object O in a relatively unstable state. By controlling the moving speed in accordance with the contact area, the handling device 10 can transport the object O by giving priority to one of the stability of holding the object O and the high speed of movement.

The handling device 10 includes a motion planning part 33 that plans a motion method including the moving speed of the holding part 200. The motion planning part 33 determines the moving speed according to the safety rate. The controller 43 operates the holding part 200 according to the motion method planned by the motion planning part 33. In a case where the safety factor is high, the holding part 200 holds the object O in a relatively stable state. In a case where the safety factor is small, the holding part 200 holds the object O in a relatively unstable state. By controlling the moving speed in accordance with the safety factor, the handling device 10 can transport the object O by giving priority to one of the stability of holding the object O and the high speed of movement.

Next, a modified example of the embodiment will be described. The calculation can be very time consuming if many objects are messily packed and there are many candidates for holding methods. In the following, the states of the object group in the first container V1 are classified into some, and the two supporting parts 201 are arranged around the object O by a method according to each state.

For example, the recognition part 20 recognizes the arrangement state of the object O in the first container V1 according to the information detected by the detection device 11. The recognition part 20 outputs information indicating the arrangement state of the object O to the planning part 30. The hold planning part 31 plans the moving method of the holding part 200 for moving the holding part 200 around the object O according to the arrangement state of the object O indicated by the information output by the recognition part 20. The hold planning part 31 generates a holding plan including a moving method and a holding method.

Figure 19A:
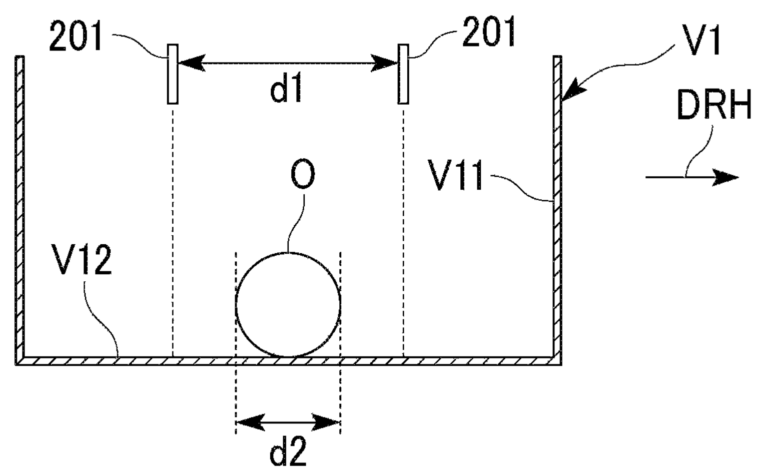
FIGS. 19A, 19B, and 19C are diagrams showing a first moving method of a holding part according to a modified example of the embodiment.
Figure 19B:
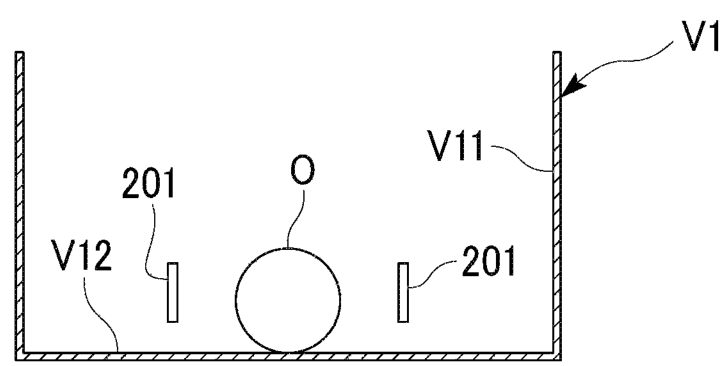
Figure 19C:
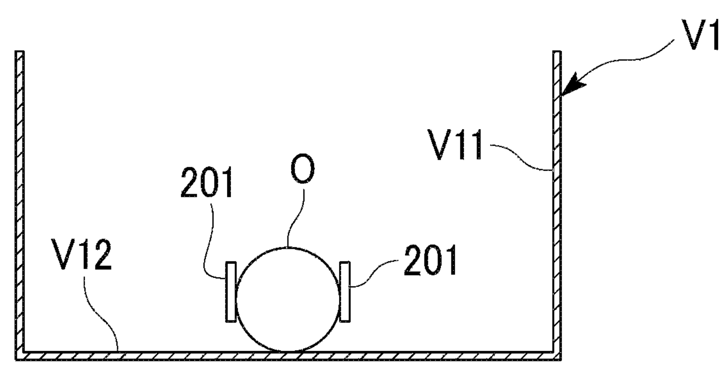

FIGS. 19A, 19B, and 19C show a first moving method of the holding part 200. In each of the following drawings, the states of the first container V1, the object O, and the holding part 200 when the first container V1, the object O, and the holding part 200 are viewed in the horizontal direction are shown. In each of the following figures, the supporting part 201 is drawn as a line indicating the position of the supporting part 201 and the connecting part 202 is not drawn in order to avoid complexity of the figures. The first container V1 includes an inner wall surface V11 and a bottom surface V12. As shown in FIG. 19A, the object O is arranged on the bottom surface V12 of the first container V1.

As shown in FIG. 19A, the controller 43 arranges the two supporting parts 201 directly above the object O. The controller 43 opens the two supporting parts 201 so that the distance d1 between the two supporting parts 201 becomes larger than the outer diameter d2 of the object O. The outer diameter d2 is the width of the object O in the horizontal direction DRH.

As shown in FIG. 19B, the controller 43 moves the two supporting parts 201 vertically downward and arranges the two supporting parts 201 around the object O.

When the distance between the two supporting parts 201 and the bottom surface V12 reaches a predetermined distance, the controller 43 closes the two supporting parts 201 as shown in FIG. 19C. The predetermined distance is a distance at which the two supporting parts 201 can hold the object O in a state associated with the safety factor when the two supporting parts 201 are closed. Since the two supporting parts 201 are closed, the two supporting parts 201 are close to each other. The holding part 200 grips and holds the object O.

Figure 20A:
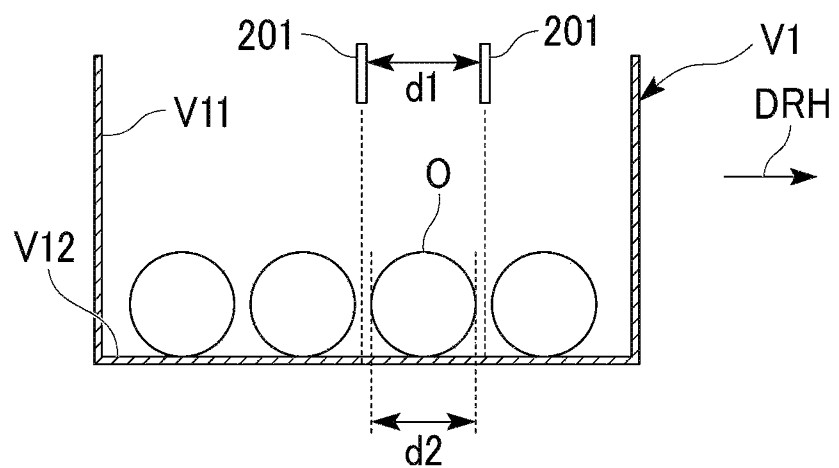
FIGS. 20A, 20B, and 20C are diagrams showing a second moving method of the holding part according to the modified example of the embodiment.
Figure 20B:
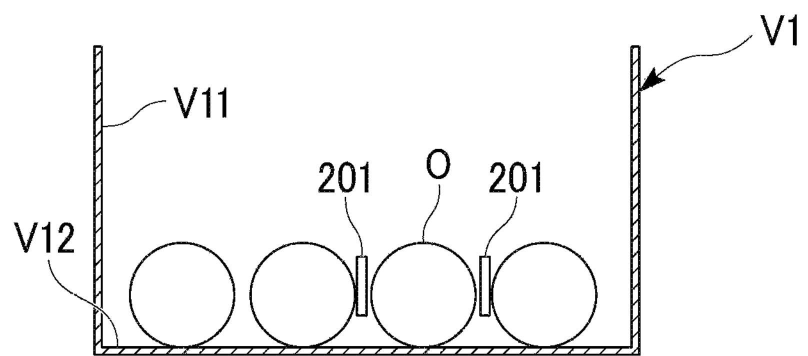
Figure 20C:
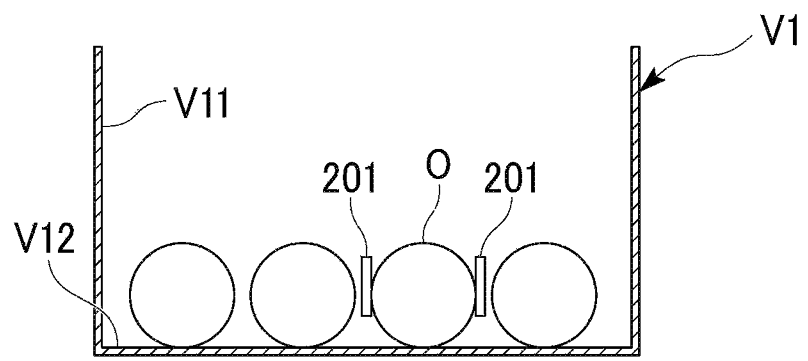

FIGS. 20A, 20B, and 20C show a second moving method of the holding part 200. As shown in FIG. 20A, a plurality of objects O are arranged on the bottom surface V12 of the first container V1. It is not necessary that the plurality of objects O be arranged at equal intervals.

As shown in FIG. 20A, the controller 43 arranges the two supporting parts 201 directly above one object O. The controller 43 opens the two supporting parts 201 so that the distance d1 between the two supporting parts 201 becomes larger than the outer diameter d2 of the object O. The outer diameter d2 is the width of the object O in the horizontal direction DRH. Since other objects are arranged around the object O, it is preferable that the distance d1 be slightly larger than the outer diameter d2.

As shown in FIG. 20B, the controller 43 moves the two supporting parts 201 vertically downward and arranges the two supporting parts 201 around the object O. The supporting part 201 is inserted into a gap between the object O and another object adjacent to the object O.

When the distance between the two supporting parts 201 and the bottom surface V12 reaches a predetermined distance, the controller 43 closes the two supporting parts 201 as shown in FIG. 20C. The predetermined distance is a distance at which the two supporting parts 201 can hold the object O in a state associated with the safety factor when the two supporting parts 201 are closed. Since the two supporting parts 201 are closed, the two supporting parts 201 are close to each other. The holding part 200 grips and holds the object O.

In the first moving method and the second moving method, the controller 43 keeps the distance d1 between the two or more supporting parts 201 larger than the outer diameter d2 of the object O, and moves the two or more supporting parts 201 around the object O (FIGS. 19A, 19B, 20A, and 20B). The controller 43 causes the holding part 200 to bring the two or more supporting parts 201 close to each other, and causes the holding part 200 to hold the object O in a state associated with the safety factor (FIGS. 19C and 20C). In a case where it is easy to arrange the two supports 201 around the object O, the handling device 10 can stably hold the object O by using the first moving method or the second moving method.

Figure 21A:
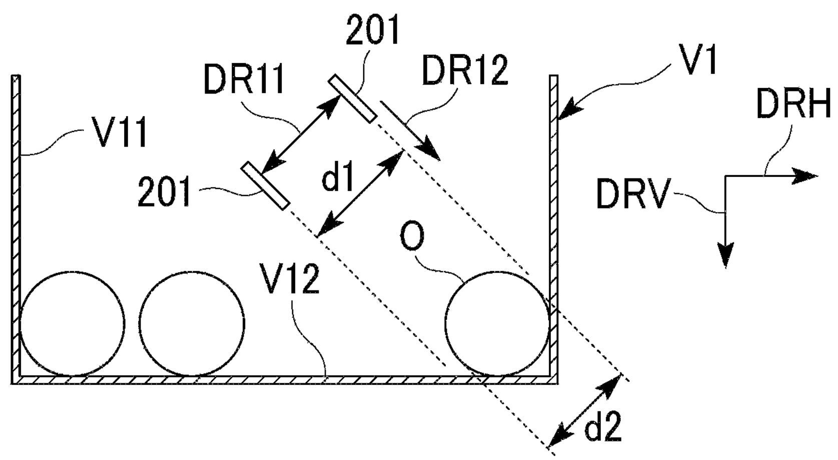
FIGS. 21A, 21B, 21C, and 21D are diagrams showing a third moving method of the holding part according to the modified example of the embodiment.

FIGS. 21A, 21B, 21C, and 21D show a third moving method of the holding part 200. As shown in FIG. 21A, a plurality of objects O are arranged on the bottom surface V12 of the first container V1. It is not necessary that the plurality of objects O be arranged at equal intervals. At least one object O is in contact with the inner wall surface V11 of the first container V1. Alternatively, the width of the gap between at least one object O and the inner wall surface V11 is smaller than a predetermined width with which one supporting part 201 can be easily inserted into the gap.

As shown in FIG. 21A, the controller 43 adjusts the orientations (angles) of the two supporting parts 201 so that the distal ends of the two supporting parts 201 face the inner wall surface V11. Further, the controller 43 opens the two supporting parts 201 such that the distance d1 between the two supporting parts 201 is larger than the outer diameter d2 of the object O in contact with the inner wall surface V11. After the two supporting parts 201 are opened, the direction DR11 in which the two supporting parts 201 are separated from each other intersects the horizontal direction DRH. The longitudinal direction DR12 of the supporting part 201 intersects the vertical direction DRV. For example, the direction DR11 is inclined 45 degrees with respect to the horizontal direction DRH. The outer diameter d2 is the width of the object O in the direction DR11.

Figure 21B:
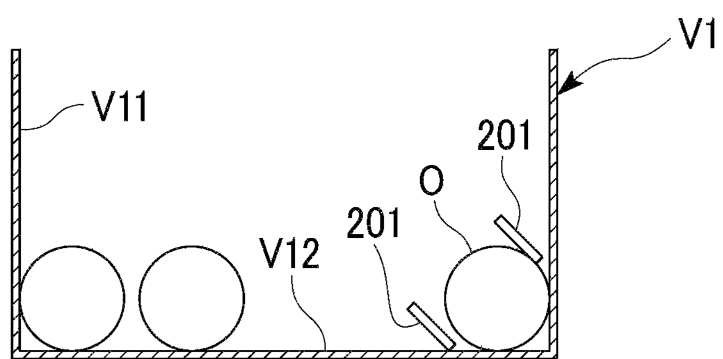

As shown in FIG. 21B, the controller 43 moves the two supporting parts 201 in the longitudinal direction DR12 of the supporting part 201 and arranges the two supporting parts 201 around the object O. In the example shown in FIG. 21B, the two supporting parts 201 are arranged so that one of the two supporting parts 201 contacts the object O. The two supports 201 need not be in contact with the object O. The two supporting parts 201 are arranged so that the two supporting parts 201 can hold the object O in a state associated with the safety factor when the two supporting parts 201 are closed.

Figure 21C:
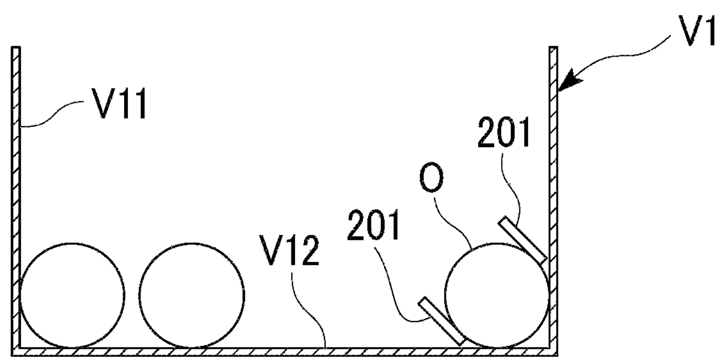

Then, as shown in FIG. 21C, the controller 43 closes the two supporting parts 201. Since the two supporting parts 201 are closed, the two supporting parts 201 are close to each other. The holding part 200 grips the object O.

Figure 21D:
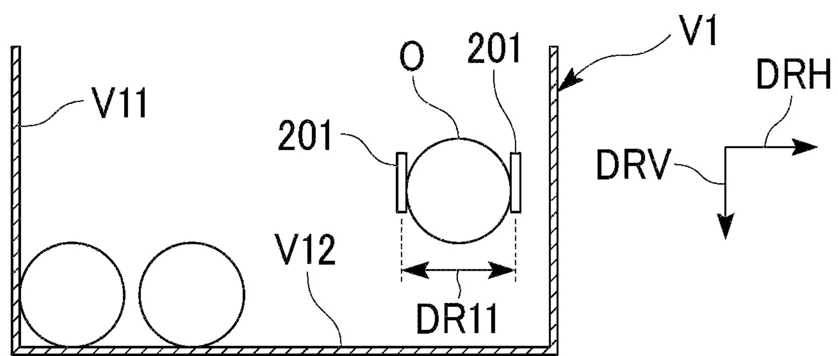

After the holding part 200 grips the object O, the controller 43 adjusts the orientations (angles) of the two supporting parts 201 so that the direction DR11 is parallel to the horizontal direction DRH as shown in FIG. 21D. Thereby, the holding part 200 holds the object O in a state associated with the safety factor.

In the third moving method, the object O is arranged on the bottom surface V12 of the first container V1 having the inner wall surface V11 and the bottom surface V12. The controller 43 separates the two or more supporting parts 201 from each other in the direction DR11 intersecting the horizontal direction DRH, and moves the two or more supporting parts 201 around the object O (FIGS. 21A and 21B). The controller 43 causes the holding part 200 to bring the two or more supporting parts 201 close to each other, and causes the holding part 200 to hold the object O in a state associated with the safety factor (FIGS. 21C and 21D). In a case where the object O is in contact with the inner wall surface V11 of the first container V1, or in a case where the distance between the object O and the inner wall surface V11 is small, the handling device 10 can stably hold the object O by using the third moving method.

Figure 22A:
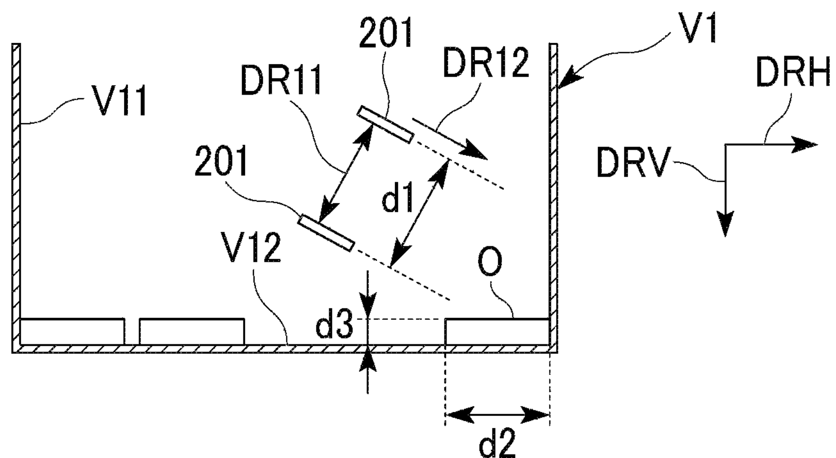
FIGS. 22A, 22B, 22C, and 22D are diagrams showing a fourth moving method of the holding part according to the modified example of the embodiment.

FIGS. 22A, 22B, 22C, and 22D show a fourth moving method of the holding part 200. As shown in FIG. 22A, a plurality of flat objects O are arranged on the bottom surface V12 of the first container V1. It is not necessary that the plurality of objects O be arranged at equal intervals. The object O is arranged such that a relatively wide surface (flat surface) contacts the bottom surface V12. The outer diameter d2 of the object O is larger than the thickness d3 of the object O. The outer diameter d2 is the width of the object O in the horizontal direction DRH. The thickness d3 is the distance between the two flat surfaces of the object O, and is the width of the object O in the vertical direction DRV.

As shown in FIG. 22A, the controller 43 adjusts the orientations (angles) of the two supporting parts 201 so that the distal ends of the two supporting parts 201 face the inner wall surface V11. Further, the controller 43 opens the two supporting parts 201 so that the distance d1 between the two supporting parts 201 becomes larger than the thickness d3 of the object O. After the two supporting parts 201 are opened, the direction DR11 in which the two supporting parts 201 are separated from each other intersects the horizontal direction DRH. The longitudinal direction DR12 of the supporting part 201 intersects the vertical direction DRV.

Figure 22B:
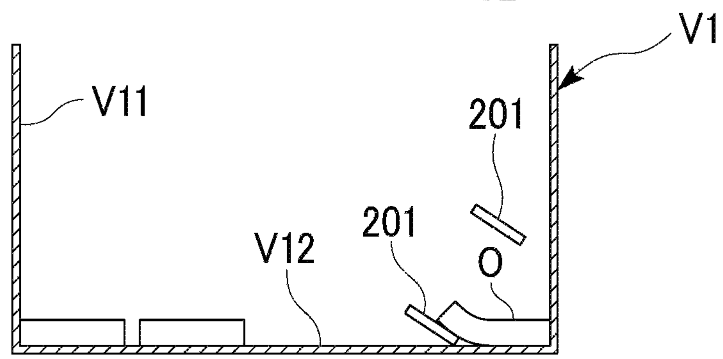

The controller 43 moves the two supporting parts 201 vertically downward until one of the two supporting parts 201 contacts the bottom surface V12 of the first container V1. After that, as shown in FIG. 22B, the controller 43 moves the two supporting parts 201 in the horizontal direction DRH along the bottom surface V12 of the first container V1. The two supporting parts 201 move toward the inner wall surface V11 of the first container V1. One of the two supporting parts 201 pushes up the end portion of the object O arranged near the inner wall surface V11. One of the two supporting parts 201 is inserted into the gap between the object O and the bottom surface V12. In a case where the object O is in contact with the inner wall surface V11, the controller 43 can easily insert the supporting part 201 into the gap between the object O and the bottom surface V12. The two supporting parts 201 are arranged so that the two supporting parts 201 can hold the object O in a state associated with the safety factor when the two supporting parts 201 are closed.

Figure 22C:
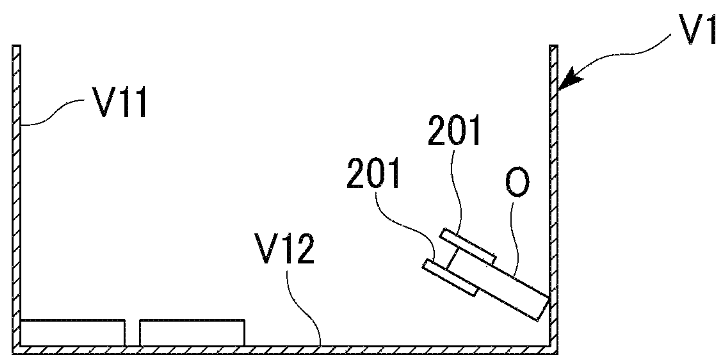

After that, as shown in FIG. 22C, the controller 43 closes the two supporting parts 201. Since the two supporting parts 201 are closed, the two supporting parts 201 are close to each other. The holding part 200 grips the object O.

Figure 22D:
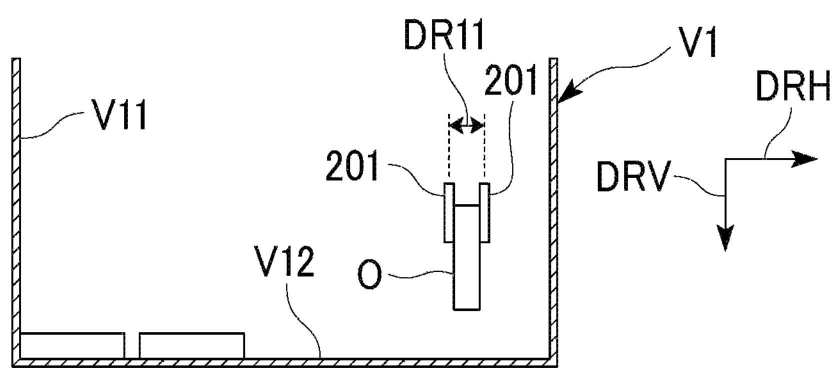

After the holding part 200 grips the object O, the controller 43 adjusts the orientations (angles) of the two supporting parts 201 so that the direction DR11 is parallel to the horizontal direction DRH as shown in FIG. 22D. Thereby, the holding part 200 holds the object O in a state associated with the safety factor.

In the fourth moving method, the shape of the object O is flat, and the object O is arranged so that the flat surface of the object O contacts the bottom surface V12 of the first container V1 having the inner wall surface V11 and the bottom surface V12. The controller 43 separates the two or more supporting parts 201 from each other in the direction DR11 intersecting the horizontal direction DRH, and moves the two or more supporting parts 201 toward the inner wall surface V11 along the bottom surface V12 (FIGS. 22A and 22B). The controller 43 causes the holding part 200 to bring the two or more supporting parts 201 close to each other, and causes the holding part 200 to hold the object O in a state associated with the safety factor (FIGS. 22C and 22D. In a case where a plurality of flat objects O are arranged, the handling device 10 can stably hold the object O by using the fourth moving method.

Figure 23A:
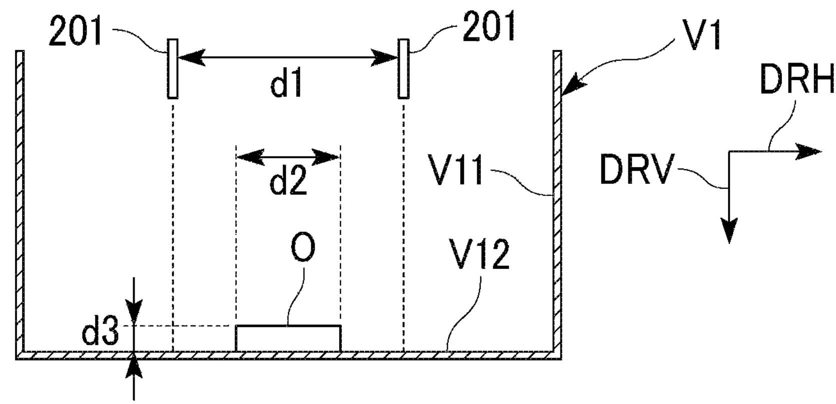
FIGS. 23A, 23B, and 23C are diagrams showing a fifth moving method of the holding part according to the modified example of the embodiment.
Figure 23B:
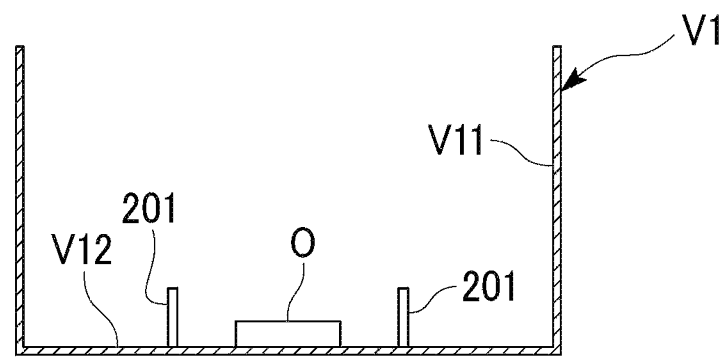
Figure 23C:
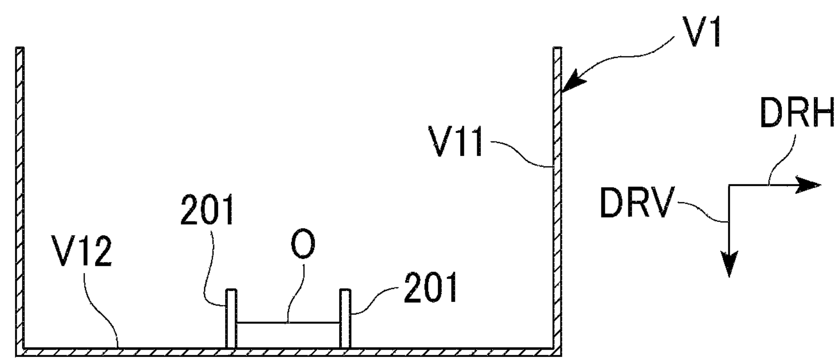

FIGS. 23A, 23B, and 23C show a fifth moving method of the holding part 200. As shown in FIG. 23A, the flat object O is placed on the bottom surface V12 of the first container V1. The object O is arranged such that a relatively wide surface (flat surface) contacts the bottom surface V12. The outer diameter d2 of the object O is larger than the thickness d3 of the object O. The outer diameter d2 is the width of the object O in the horizontal direction DRH. The thickness d3 is the distance between the two flat surfaces of the object O, and is the width of the object O in the vertical direction DRV.

As shown in FIG. 23A, the controller 43 arranges the two supporting parts 201 directly above the object O. The controller 43 opens the two supporting parts 201 so that the distance d1 between the two supporting parts 201 becomes larger than the outer diameter d2 of the object O.

As shown in FIG. 23B, the controller 43 moves the two supporting parts 201 vertically downward and arranges the two supporting parts 201 around the object O. The two supporting parts 201 contact the bottom surface V12.

After that, the controller 43 closes the two supporting parts 201 as shown in FIG. 23C. In order to grip the object O while pressing the two supporting parts 201 against the bottom surface V12, the controller 43 controls the holding part 200 so that, for example, the first force information output from the first force detector 41 shows a constant value. The first force information indicates the magnitude of the force generated in the moving mechanism 100 in the vertical direction DRV. Since the two supporting parts 201 are closed, the two supporting parts 201 are close to each other. The holding part 200 grips and holds the object O.

In the fifth movement method, the shape of the object O is flat, and the object O is arranged so that the flat surface of the object O contacts the bottom surface V12 of the first container V1 having the inner wall surface V11 and the bottom surface V12. The controller 43 keeps the distance between the two or more supporting parts 201 larger than the outer diameter d2 of the object O (FIG. 23A). The controller 43 moves the two or more supporting parts 201 around the object O, and brings the two or more supporting parts 201 into contact with the bottom surface V12 (FIG. 23B). The controller 43 causes the holding part 200 to bring the two or more supporting parts 201 close to each other, and causes the holding part 200 to hold the object O in a state associated with the safety factor (FIG. 23C). In a case where the object O is arranged such that the flat surface of the object O contacts the bottom surface V12, the handling device 10 can stably hold the object O by using the fifth moving method.

Figure 24A:
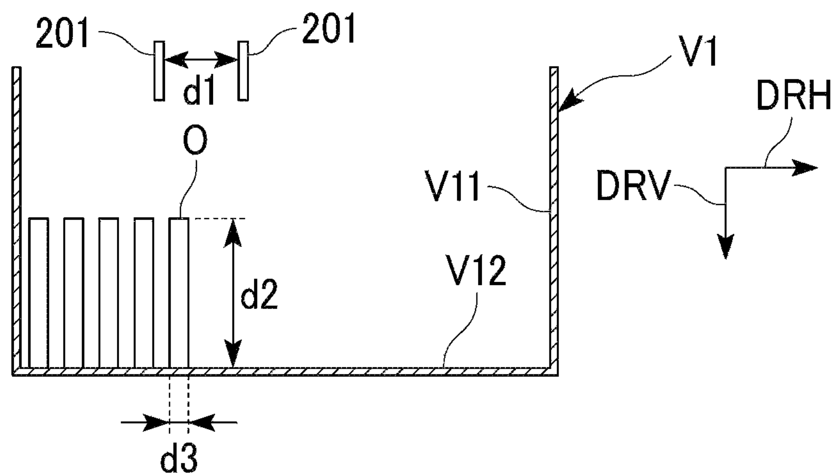
FIGS. 24A, 24B, and 24C are diagrams showing a sixth moving method of the holding part according to the modified example of the embodiment.
Figure 24B:
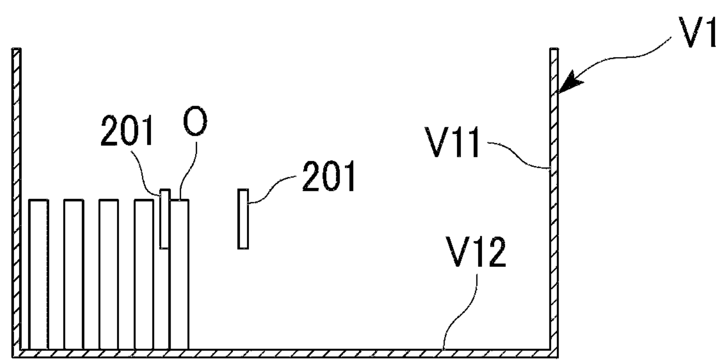
Figure 24C:
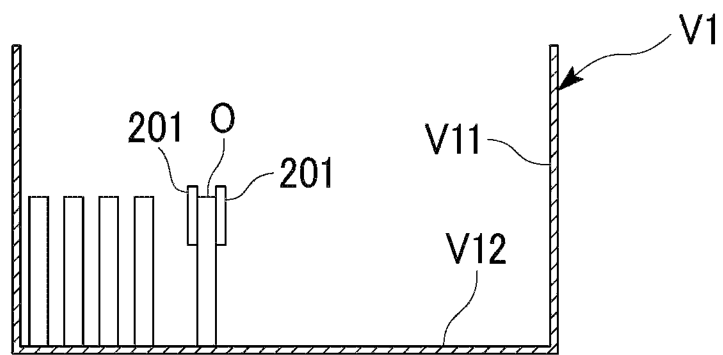

FIGS. 24A, 24B, and 24C show a sixth moving method of the holding part 200. As shown in FIG. 24A, a plurality of flat objects O are arranged on the bottom surface V12 of the first container V1. It is not necessary that the plurality of objects O be arranged at equal intervals. The plurality of objects O may be in contact with each other. The object O is arranged such that a relatively wide surface (flat surface)

stands on the bottom surface V12 of the first container V1. The flat surface of the object O faces the inner wall surface V11 of the first container V1. The relatively narrow surface (side surface) of the object O is in contact with the bottom surface V12. The outer diameter d2 of the object O is larger than the thickness d3 of the object O. The outer diameter d2 is the width of the object O in the vertical direction DRV. The thickness d3 is the distance between the two flat surfaces of the object O, and is the width of the object O in the horizontal direction DRH.

As shown in FIG. 24A, the controller 43 arranges the two supporting parts 201 directly above the outermost object O in the array of the plurality of objects O. The controller 43 opens the two supporting parts 201 so that the distance d1 between the two supporting parts 201 is larger than the thickness d3 of the object O.

As shown in FIG. 24B, the controller 43 moves the two supporting parts 201 vertically downward and arranges the two supporting parts 201 around the object O. One of the two supporting parts 201 is inserted into a gap between the object O and another object adjacent to the object O.

In a case where the distance between the two supporting parts 201 and the bottom surface V12 reaches a predetermined distance, the controller 43 closes the two supporting parts 201 as shown in FIG. 24C. The predetermined distance is a distance at which the two supporting parts 201 can hold the object O in a state associated with the safety factor when the two supporting parts 201 are closed. Since the two supporting parts 201 are closed, the two supporting parts 201 are close to each other. The holding part 200 grips and holds the object O.

In the sixth moving method, the shape of the object O is flat, and the object O is arranged so that the flat surface of the object O stands on the bottom surface V12 of the first container V1 having the inner wall surface V11 and the bottom surface V12. The controller 43 keeps the distance between the two or more supporting parts 201 larger than the thickness of the object O and moves the two or more supporting parts 201 around the object O (FIGS. 24A and 24B). The controller 43 causes the holding part 200 to bring the two or more supporting parts 201 close to each other, and causes the holding part 200 to hold the object O in a state associated with the safety factor (FIG. 24C). In a case where the object O is arranged such that the flat surface of the object O stands on the bottom surface V12, the handling device 10 can stably hold the object O by using the sixth moving method.

In the above modification, the two supporting parts 201 are arranged around the object O by a method according to the state of the object group in the first container V1. The handling device 10 can prevent waste of processing time for complicated and large amount of information in the first stage processing in which the hold planning part 31 precisely calculates the holding method.

Although some embodiments and modifications have been described above, the embodiments are not limited to the above examples. For example, some functional parts of the operation device 12 may be provided in the management device 13 instead of the handling device 10. For example, the recognition part 20, the planning part 30, and the execution part 40 may be provided in the management device 13.

According to at least one embodiment described above, the handling device 10 includes the holding part 200, the hold planning part 31, and the controller 43. The holding part 200 includes two or more supporting parts 201 and can hold the object O by gripping the object O by the two or more supporting parts 201. The hold planning part 31 calculates a safety factor indicating the safety of the state in which the holding part 200 holds the object O. The controller 43 causes the holding part 200 to hold the object O according to the safety rate. With such a configuration, the handling device 10 can stably hold the object O.

A part or all of the transport system 1 in the above-described embodiment may be realized by a computer. In that case, the program for realizing the control function may be recorded in a computer-readable recording medium, and the program recorded in the recording medium may be read by a computer system and executed. The "computer system" referred to here is a computer system built in the transport system 1 and includes an OS and hardware such as peripheral devices. Further, the "computer-readable recording medium" refers to a portable medium such as a flexible disk, a magneto-optical disk, a ROM, a CD-ROM, or a storage device such as a hard disk built in a computer system.

Further, "computer-readable recording medium" means a program that dynamically holds a program for a short time, such as a communication line when transmitting the program through a network such as the Internet or a communication line such as a telephone line. In this case, a volatile memory inside the computer system that serves as a server or a client in which the program is held for a certain period of time may be included. Further, the program may be for realizing a part of the functions described above, or may be a program that can realize the functions described above in combination with a program already recorded in the computer system.

For example, the program may cause the computer of the control device to execute the calculation step and the control step. In the calculation step, the computer calculates a safety factor indicating the safety of the state in which the holding part 200 that can hold the object O holds the object O by gripping the object O with two or more supporting parts 201. In the control step, the computer causes the holding part 200 to hold the object O according to the safety factor.

Moreover, a part or all of the transport system 1 in the above-described embodiment may be implemented as integrated circuits, such as LSI (Large Scale Integration). Each functional block of the transport system 1 may be individually implemented as a processor, or part or all of the functional blocks may be integrated and implemented as a processor. Further, the method of circuit integration is not limited to LSI, and may be realized by a dedicated circuit or a general-purpose processor. Further, in the case in which an integrated circuit technology that replaces the LSI appears due to the progress of semiconductor technology, an integrated circuit according to the technology may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A handling device comprising:

a holding part that includes two or more supporting parts and is capable of holding an object by gripping the object with the two or more supporting parts;

a memory configured to store computer executable programs;

a processor configured to, when executing the programs stored in the memory, calculate a safety factor indicating safety of a state of the holding part holding the object; and a controller configured to cause the holding part to hold the object according to the safety factor, wherein the safety factor is calculated based on:

a bending stress caused in regions where the supporting part contacts the object, and a friction pressure generated in the regions where the supporting part contacts the object, wherein the bending stress is calculated based on:

a value related to an area of the regions where the supporting part contacts the object, a distance between a reference position in the regions and a center of gravity of the object, and a mass of the object, and wherein the controller changes a moving direction of the holding part based on the safety factor.

2. The handling device according to claim 1, wherein the processor is further configured to, when executing the programs stored in the memory, plan a motion method including a moving speed of the holding part, wherein the processor is configured to determine the moving speed according to an area of a region where the supporting part and the object are in contact with each other, and the controller is configured to operate the holding part according to the motion method planned by the processor.

3. The handling device according to claim 1, wherein the processor is further configured to, when executing the programs stored in the memory, plan a motion method including a moving speed of the holding part, wherein the processor is configured to determine the moving speed according to the safety factor, and the controller is configured to operate the holding part according to the motion method planned by the processor.

4. The handling device according to claim 1, wherein the controller is configured to keep distance a between the two or more supporting parts larger than an outer diameter of the object, and to move the two or more supporting parts around the object, the controller is configured to cause the holding part to bring the two or more supporting parts close to each other, and to cause the holding part to hold the object in the state associated with the safety factor.

5. The handling device according to claim 1, wherein the object is arranged on a bottom surface of a container having an inner wall surface and the bottom surface, the controller is configured to separate the two or more supporting parts from each other in a direction intersecting a horizontal direction, and to move the two or more supporting parts around the object, and the controller is configured to cause the holding part to bring the two or more supporting parts close to each other, and to cause the holding part to hold the object in the state associated with the safety factor.

6. The handling device according to claim 1, wherein a shape of the object is flat, and the object is arranged so that a flat surface of the object contacts a bottom surface of a container having an inner wall surface and the bottom surface, the controller is configured to separate the two or more supporting parts from each other in a direction intersecting a horizontal direction, and to move the two or more supporting parts toward the inner wall surface along the bottom surface, and the controller is configured to cause the holding part to bring the two or more supporting parts close to each other, and to cause the holding part to hold the object in the state associated with the safety factor.

7. The handling device according to claim 1, wherein a shape of the object is flat, and the object is arranged so that a flat surface of the object contacts a bottom surface of a container having an inner wall surface and the bottom surface, the controller is configured to keep a distance between the two or more supporting parts larger than an outer diameter of the object, to move the two or more supporting parts around the object, and to contact the two or more supporting parts with the bottom surface, and the controller is configured to cause the holding part to bring the two or more supporting parts close to each other, and to cause the holding part to hold the object in the state associated with the safety factor.

8. The handling device according to claim 1, wherein a shape of the object is flat, and the object is arranged so that a flat surface of the object stands on a bottom surface of a container having an inner wall surface and the bottom surface, the controller is configured to keep a distance between the two or more supporting parts larger than a thickness of the object, and to move the two or more supporting parts around the object, and the controller is configured to cause the holding part to bring the two or more supporting parts close to each other, and to cause the holding part to hold the object in the state associated with the safety factor.

9. A control device comprising:

a memory configured to store computer executable programs;

a processor that, when executing the programs stored in the memory, calculates a safety factor indicating safety of a state in which a holding part holds an object by gripping the object with two or more supporting parts; and a controller configured to cause the holding part to hold the object according to the safety factor, wherein the safety factor is calculated based on:

a bending stress caused in regions where the supporting part contacts the object, and a friction pressure generated in the regions where the supporting parts contact the object, wherein the bending stress is calculated based on:

a value related to an area of the regions where the supporting part contacts the object, a distance between a reference position in the regions and a center of gravity of the object, and a mass of the object, and wherein the controller changes a moving direction of the holding part based on the safety factor.

10. The control device according to claim 9, wherein the processor is configured to, when executing the programs stored in the memory, plan a motion method including a moving speed of the holding part, wherein the processor is configured to determine the moving speed according to an area of a region where the supporting part and the object are in contact with each other, and the controller is configured to operate the holding part according to the motion method planned by the processor.

11. The control device according to claim 9, wherein the processor is configured to, when executing the programs stored in the memory, plan a motion method including a moving speed of the holding part, wherein the processor, is configured to determine the moving speed according to the safety factor, and the controller is configured to operate the holding part according to the motion method planned by the processor.

* * * * *